United States Patent [19]
Ivie et al.

[11] Patent Number: 5,727,055
[45] Date of Patent: Mar. 10, 1998

[54] INFORMATION COMMUNICATION SYSTEMS

[75] Inventors: Lovell Brent Ivie, Sandy; Daniel Gilstrap, Salt Lake City; R. Brent Howard, Sandy; Grant Bowden, Syracuse; David Johnson, Salt Lake City, all of Utah

[73] Assignee: IES Technologies, Inc., Sandy, Utah

[21] Appl. No.: 443,413

[22] Filed: May 17, 1995

[51] Int. Cl.[6] .......................... H04M 1/00; H04M 5/00; H04M 9/00

[52] U.S. Cl. .................. 379/156; 379/165; 379/327; 379/399

[58] Field of Search ....................... 379/156, 157, 379/163, 165, 166, 167, 177, 327, 399

[56] References Cited

U.S. PATENT DOCUMENTS

| | | | |
|---|---|---|---|
| 3,665,129 | 5/1972 | Lancaster | 379/316 |
| 4,096,359 | 6/1978 | Barsellotti | 379/166 |
| 4,140,885 | 2/1979 | Verhagen | 379/166 |
| 4,578,545 | 3/1986 | Phillipson | 379/419 |
| 4,607,144 | 8/1986 | Carmon | 379/165 |
| 4,919,544 | 4/1990 | Graham | 379/399 |

*Primary Examiner*—Curtis Kuntz
*Assistant Examiner*—Vijay Shankar

*Attorney, Agent, or Firm*—Thorpe, North & Western, L.L.P.

[57] ABSTRACT

A system for distributing electronic information signals throughout a structure, particularly a residential dwelling, which adapts a plurality of electronic information signals into a signal which can be received by one or more information utilizing devices which are located throughout a structure. In accordance with particular aspects of the present invention, an improved structure and method of installing a plurality of communication cables in a wall adjacent to an existing electrical box attached to a building member is provided. An apparatus for adapting a multi-line telephone signal distribution hub for use with a single telephone line, or two telephone lines, is also included which allows the wiring for an internal KSU/PBX telephone system to be installed immediately and a single telephone line readily interfaced with a multi-line telephone signal distribution hub while a KSU/PBX control box and additional telephone lines from the telephone service utility can be readily connected at a later date. In accordance with another aspect of the present invention, a system is described for distributing audio signals from a central location to a plurality of discrete zones contained within a structure, such as a residential dwelling, which allows changes to be readily and conveniently made. Also disclosed is a system for distributing electronic signals within a room equipped for audio and video presentations and having four, five, six, or more, speaker connection locations for use in home theater applications.

4 Claims, 22 Drawing Sheets

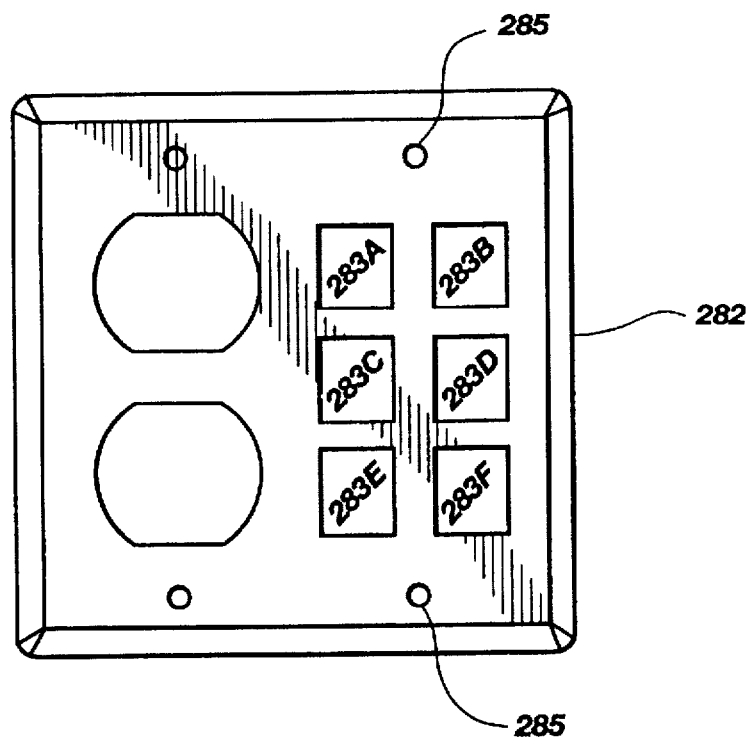
Fig. 6C
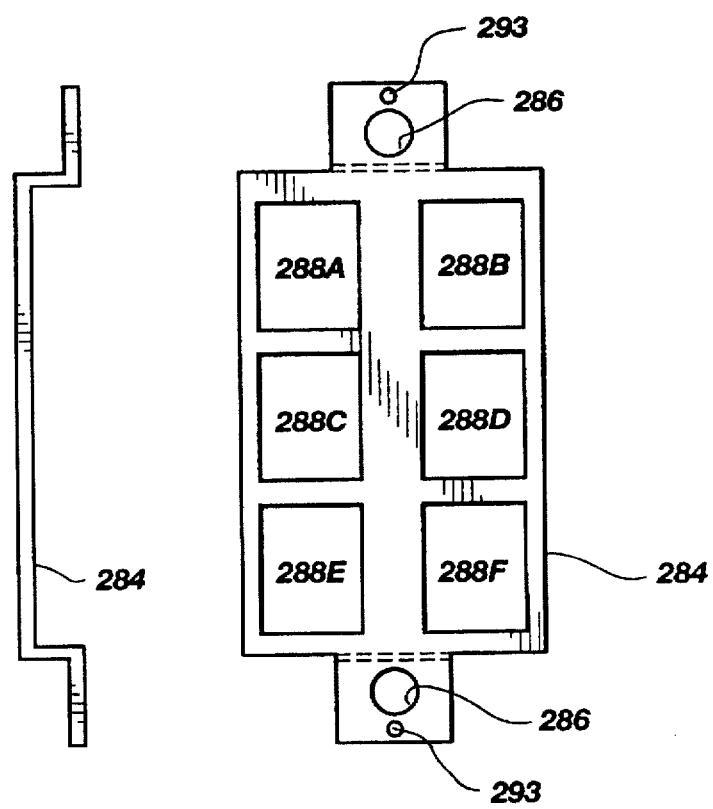
Fig. 6E  Fig. 6D

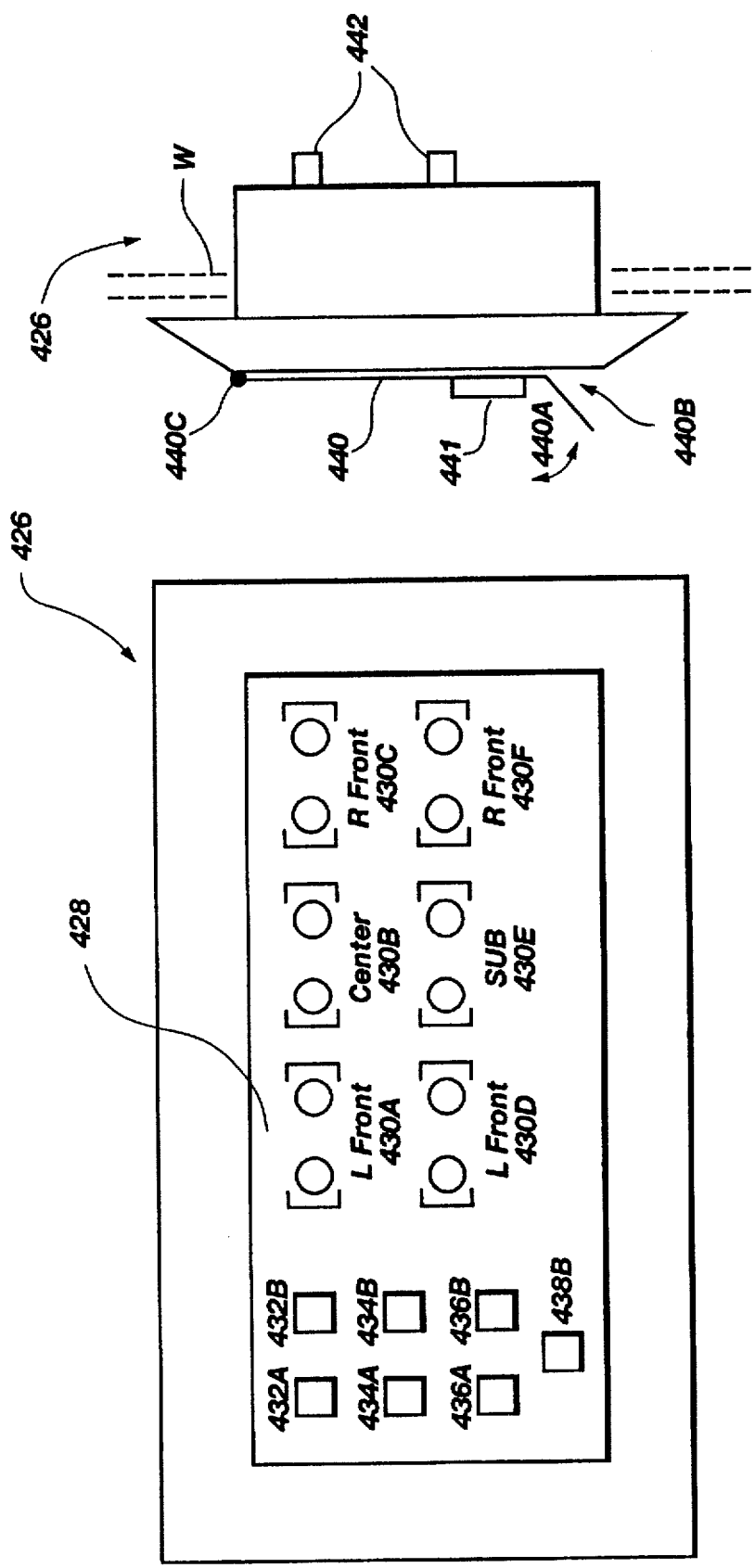

5,727,055

INFORMATION COMMUNICATION SYSTEMS

BACKGROUND

1. The Field of the Invention

This invention relates to apparatus and methods for distributing electronic information signals in a structure.

2. The Prior Art

For most of civilization's recorded existence, information has traveled from person to person via face-to-face communication or via tangible documents. With the introduction of the telegraph and the telephone the transmission of information became faster. With the later introduction of broadcasting, the transmission of the same information to vast numbers of people became almost immediate.

The concept of broadcasting has dominated information transfer during the twentieth century. Throughout the century, the customary approach in the information dissemination industry has been to distribute the largest possible quantity of identical information to as many locations as possible. In contrast to the customary wisdom in broadcasting industry, the promise of the new information transfer technologies is allowing point-to-point transmission of only the information which the recipient desires to receive.

The explosive growth and progress made in digital electronics, and particularly the popularization of the general purpose microprocessor, has propelled the information revolution now being experienced in industrialized societies. Along with the promise of delivering massive amounts of customized information to a recipient, has come the challenge of providing transmission media which can furnish the immense amount of spectrum bandwidth necessary to accommodate the digital information carrying such information.

While numerous parties have solutions for providing the broad bandwidth necessary for getting the necessary digital information to a curbside location, relatively little attention has been given to distributing the digital information inside of the building at the end user's location, particularly residential dwellings. Until most recently, a twisted pair of wires carrying a bandwidth limited telephone signal, and in some cases a coaxial cable carrying television signals, was considered all the information transfer media which could be desired in a structure.

With recent developments, an explosion in the amount of information which is delivered to a residential or commercial location is about to occur. References to an "information super highway" are raising the expectation that every member of a modern industrialized society will soon have access to vast amounts of information for education, business, and entertainment. Moreover, the promise is being made that this information will be delivered to both commercial and residential locations in an easy-to-use format.

Unfortunately, the promise of the information super highway has the potential of becoming another unused complicated piece of technology, particularly for the residential customer. While not recognized generally in the industry as a problem, each of the utility companies, including electric power service providers, telephone service providers, and cable television service providers, are all promising and vying to be the provider of the medium which will convey the information super highway to the multitude of residential and business customers. In order to accommodate the bandwidth needed to carrying the data on the information super highway, utility companies are proposing to devote enormous resources to installing fiber optic media, or other wide bandwidth media, to each structure within its service area.

Disadvantageously, each of the utility companies is developing and proposing proprietary protocols and hardware. Unfortunately, each of the proprietary protocols are (purposefully in some cases) not compatible with the other protocols. Some utility companies hope that their protocol can become the "standard" for the industry and thus control the market. For example, once the medium is selected, whether fiber optic cable, coaxial cable, or a microwave radio frequency link, the common understanding is that each utility company will provide a "box," i.e., hardware, which will receive the information signals conveyed on their particular medium and will process the information signals in whatever way is necessary to make it useful to the customer. Unfortunately, the outlook for the customer is that there will be a multitude of "boxes" installed within each residential or commercial structure. It appears that, for example, the local electric power provider may require a box which will interact with a television while the local cable television provider may require a PC compatible computer and Windows™ based programs with the local telephone service provider requiring the purchase of a new "smart telephone." As a further example of a utility provider is a direct satellite broadcast subscription service which requires the lease or purchase of a box for each television or device used to access the service.

In order to gain access to the information super highway, subscription to one or more of the utility company providers will be necessary in the future. Disadvantageously, under the proposed schemes, every location at which access is desired, for example in a kitchen, bedroom, den, and entertainment room in a residential structure, will require a box at each location. In other words, access at multiple points in a structure will require the purchase or rental of several boxes.

BRIEF SUMMARY AND OBJECTS OF THE INVENTION

In view of the above-described state of the art, the present invention seeks to realize the following objects and advantages.

It is an object of the present invention to provide simplified installation of information generating and information utilizing devices in a structure so that the information signals may be distributed and utilized more efficiently.

It is also an object of the present invention to provide an improved method and structure for installing a plurality of communication cables in a wall adjacent to an existing electrical box attached to a building member.

It is also an object of the present invention to adapt a multi-line telephone signal distribution hub for use with a single telephone line, or two telephone lines, which allows the wiring for an internal KSU/PBX telephone system to be installed and a single telephone line to be readily interfaced with the multi-line wiring of the telephone signal distribution hub while allowing a KSU/PBX control box and additional telephone lines from the telephone service utility to be readily connected at a later date.

It is a further object of the present invention to provide a system for distributing audio signals from a central location to a plurality of discrete zones contained within a structure, such as a residential dwelling, which allows changes to be readily and conveniently made.

It is another object of the present invention to provide a system for distributing electronic signals within a room equipped for audio and video presentations and having four, five, six, or more, speaker connection locations for use in home theater applications and which allows home theater components to be easily and properly set up or changed.

It is another object of the present invention to provide an electronic information interface which interfaces with a plurality of information signals received over a variety of media at a residential or commercial structure and convert those information signals to a common protocol which can be recognized by all of the information utilizing devices in the residential or commercial structure.

It is also an object of the present invention to provide an electronic information interface which is configurable to be used with numerous different types of information utilization devices which are present in a residential or commercial structure.

It is a further object of the present invention to provide an electronic information interface with is capable of bidirectional information transfer.

It is another object of the present invention to provide an electronic information interface which can be programmed from a remote location such as from a utility service provider central office.

It is yet another object of the present invention to provide an electronic information interface which is modular and can be easily expanded when desired.

It is yet another object of the present invention to provide an electronic information interface which can accommodate wide bandwidth information signals.

It is still another object of the present invention to provide an electronic information interface which can receive information conveyed via a variety of different media and convert the information from any of a variety of protocols to a common protocol.

It is a also an object of the present invention to provide an electronic information distribution system for use in a structure which is flexible and can be adapted for use with electronic information signals which may be devised in the future.

It is a further object of the present invention to provide an information distribution system which is readily understandable and workable by a user.

These and other objects and advantages of the invention will become more fully apparent from the description and claims which follow, or may be learned by the practice of the invention.

In accordance with one aspect of the present invention, an improved method and structure for installing a plurality of communication cables in a wall adjacent to an existing electrical box attached to a building member is provided. The improved method and structures preferably include a template for cutting a properly sized hole in the wall, a mounting frame which is inserted into the hole and attaches to the wall, and a capture plate configured for holding a plurality of connectors attached to respective communication cables. The method provides that the communications cables are positioned inside of the wall away from potential harm during the installation of wall board. A cover plate conceals the capture plate and mounting frame and provides a more satisfactory installation of the communication cables.

In order to install multi-line telephone system wiring, but readily adapt it for use with a single telephone line, another aspect of the present invention adapts a multi-line telephone signal distribution hub for use with a single telephone line, or two telephone lines. The apparatus preferably connects the jacks provided on the telephone signal distribution hub in parallel with each other which allows the wiring for an internal KSU/PBX telephone system to be installed and a single telephone line to be readily interfaced with the multi-line wiring of the telephone signal distribution hub. A KSU/PBX telephone system control box and additional telephone lines from the telephone service utility can be readily connected at a later date.

In accordance with another particular aspect of the present invention, a system for distributing audio signals from a central location to a plurality of discrete zones contained within a structure, such as a residential dwelling, is also provided. The system allows changes to be readily and conveniently made in the distribution of audio signals by making the necessary signals available in a single location and providing that all of the connections which are made by a user, for example a homeowner, are accessible from the front of the apparatus, rather than requiring access to the rear of equipment, and by providing readily understandable visual notation on the apparatus.

Another aspect of the present invention greatly simplifies the setting up and operation of home theater installations in a room equipped with four, five, six, or more, speaker connection locations. The apparatus of the present invention allows home theater components to be easily and properly set up or changed.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are represented in the accompanying drawings. Understanding that these drawings depict only typical embodiments of the invention and are not therefore to be considered limiting of its scope, the invention will be described and explained with additional specificity and detail through the use of the accompanying drawings in which:

FIG. 6C illustrates a cover plate structure used in the cable connection holder structure represented in FIG. 6B.

FIGS. 6D and 6E are front and side views, respectively, of a capture plate structure used in the cable connection holder structure represented in FIG. 6B.

FIGS. 11A–C are views of a home theater signal collection and distribution system.

DETAILED DESCRIPTION OF THE PREFERRED EMBODIMENTS

Reference will now be made to the drawings wherein like structures will be provided with like reference designations.

In accordance with one aspect of the present invention, described herein is an electronic information distribution system, which also is generally referred to as a "network" in the industry, which is flexible and which can be adapted for future technologies. It is to be understood that the terms "electronic information" and "electronic information signals," as used herein, are intended to refer to any information which is carried by a conductor such as a conductor of electricity or a conductor a light, e.g., an optical fiber. Such information signals can also be carried over modulated radio frequency and infrared broadcast transmissions in accordance with the present invention.

Figure 1:
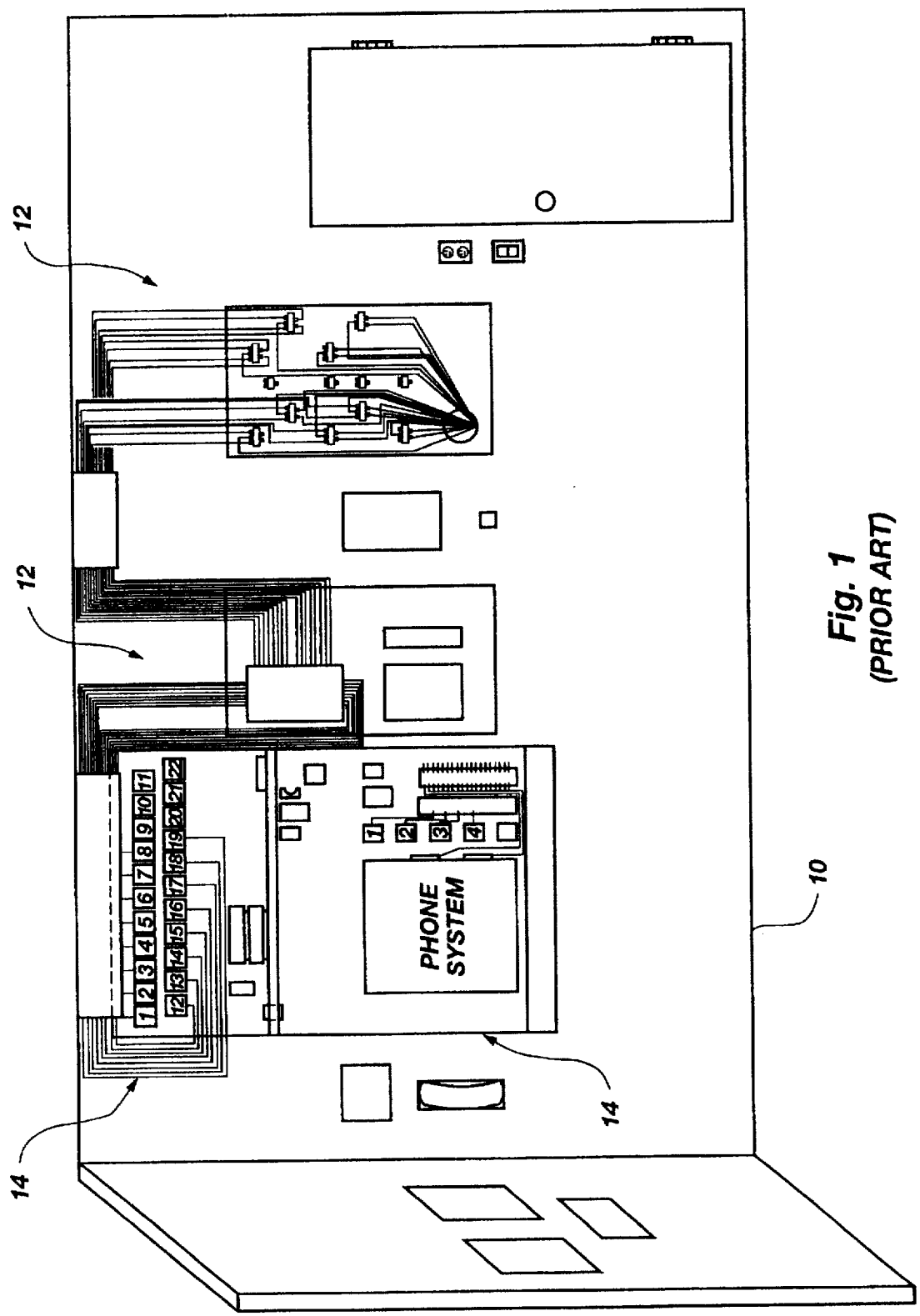
FIG. 1 is a diagrammatic representation of the prior art.

FIG. 1 provides a representation of a modern information distribution system present in a residential dwelling using previously available schemes. The information distribution system represented in FIG. 1 is typical of the most advanced available technology prior to the present invention. The hallmark of such a prior art arrangement is the haphazard myriad of cables and connectors which are required to distribute the information carrying signals. Because of the difficulty of installing such a prior art arrangement, only those cables and components which are essential to the required functions are installed; installing additional cables and devices which are not required at the present to carry out the functions required at the time would add to the confusion and difficulty of the installation.

FIG. 1 shows a portion of a utility room with nearly an entire wall, generally designated at 10, in the room being devoted to distributing information signals to just the rooms in the residential dwelling which currently require such signals; no accommodation for future needs has been made. Represented generally at 12 in FIG. 1 is an arbitrary arrangement of coaxial cables and devices which are capable of conveying television signals into rooms to which coaxial cables have been strung.

Also represented generally at 14 in FIG. 1 is a plurality of twisted pair cables which are used to convey telephone signals which arrive on one of the four telephone lines coming into the house to those rooms already provided with the necessary telephone connectors. The signals which the twisted pair cables convey also commonly include doorbell signals, telephone signals to a number of rooms, and thermostat signals to the heating and cooling system. Nowhere in the arrangement represented in FIG. 1 is accommodation made for distributing bidirectional wide band information signals to the rooms of the home.

Figure 2A:
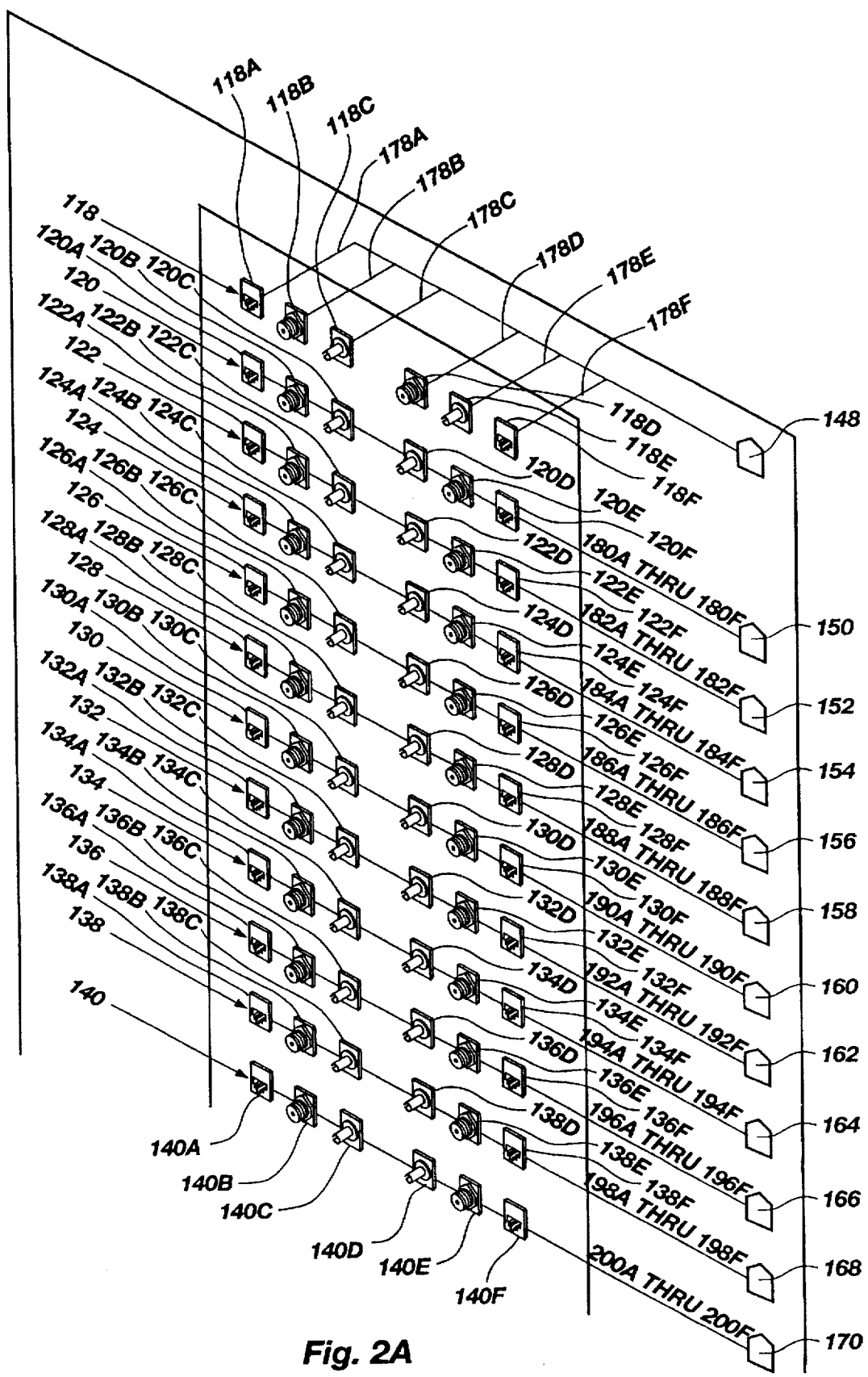
FIGS. 2A and 2B are a diagrammatic representation of a first embodiment of the present invention.
Figure 2B:
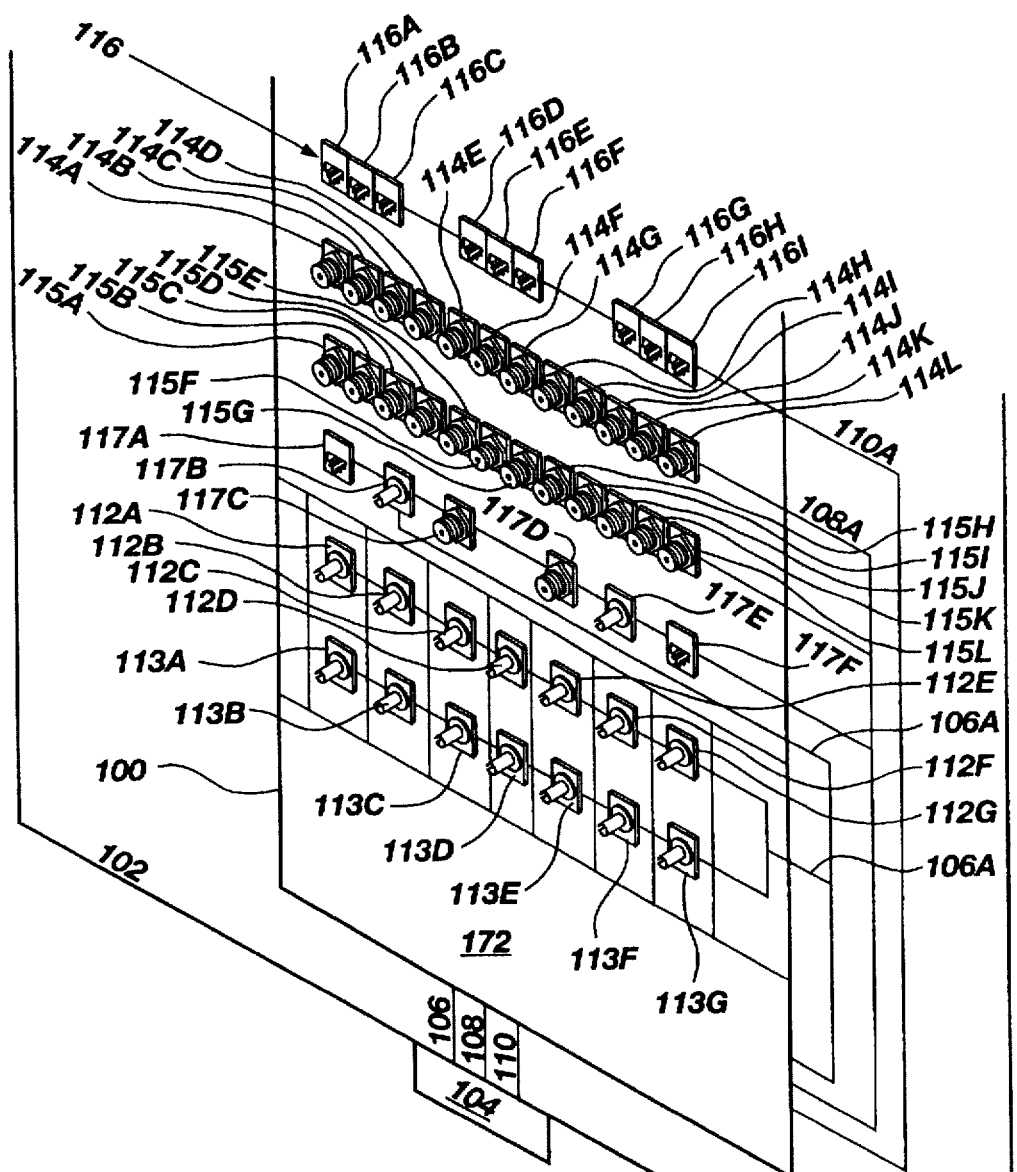

Reference will next be made to FIGS. 2A and 2B which is a diagrammatic representation of a first embodiment of the present invention. Depicted in FIGS. 2A and 2B is a man-made structure which is represented by the box 102. The structure preferably represents a residential dwelling structure, such as commonly referred to as a "home" or a "house." The structure 102 can also preferably be a commercial structure, such as an office building or an industrial facility. Furthermore, the term "structure," as used herein, may also include a man-made edifices which are not contiguous, such as a number of individual buildings which are separated by large distances. The present invention, however, provides the greatest benefits in when applied in a residential dwelling structure due to the traditional construction techniques and customs in the industry. Significantly, not only has the industry not answered the problems which the present invention solves but the industry has not wholly recognized such problems.

The invention described herein can be used with many other advantageous devices and systems. For example, the system described in U.S. patent application Ser. No. 08/326, 684 entitled Automated Appliance System, which is now incorporated herein by reference in its entirety, describes a system which may be used in cooperation with the present invention. U.S. patent application Ser. Nos. 08/290,230 (entitled Electronic information Distribution System) and 08/301,910 (entitled Electronic information Interface) also provide useful information and are now incorporated herein by reference in their entireties.

Represented diagrammatically in FIGS. 2A and 2B are twelve enclosures (148, 150, 152, 154, 156, 158, 160, 162, 164, 166, 168, and 170) which preferably represent rooms which are commonly found in a residential dwelling. Alternatively, the rooms (148, 150, 152, 154, 156, 158, 160, 162, 164, 166, 168, and 170) may represent areas or rooms in a commercial structure or other man-made edifice.

One preferred embodiment of the electronic information distribution apparatus of the present invention is generally represented at 100 in FIGS. 2A and 2B. The apparatus is commonly referred to in the art as the "node zero" since all signals entering or leaving at other nodes on the information distribution system are routed through the apparatus 100. The apparatus 100 conveniently and flexibly provides that information signals can be routed or disseminated from the apparatus 100 to any of the enclosures (148, 150, 152, 154, 156, 158, 160, 162, 164, 166, 168, and 170). The apparatus 100 receives information signals from any of a number of external and internal sources which may be presently available or which may become available in the future and distributes such information wherever desired in the structure.

Represented in FIGS. 2A and 2B is a junction box 104 which receives information signals from an external source. The external source may be characterized as a source of, for example, telephone signals, cable television signals, satellite broadcast reception signals, and antenna reception signals. While it is currently common to convey cable television signals via coaxial cables, and to convey telephone signals up to the junction box 104 via twisted pair cables, the present invention provides the great advantage of accommodating such information signals regardless of the media used to convey such signals. It is also advantageously within the scope of the present invention to convey information signals in both "upstream" and "downstream" directions, either on a single cable or on two or more cables. Thus, the apparatus 100 can receive and redistribute information received from any number of devices positioned throughout the structure 102.

In FIGS. 2A and 2B, three cables 106, 108, and 110 are illustrated connecting the junction box 104 to a signal processor 172. Cable 110 preferably comprises twisted pair cables as customarily used to convey telephone signals. Cable 108 is preferably a coaxial cable as is customarily used to convey television signals and other radio frequency signals. Cable 106 is preferably a sheathed optical fiber cable which is generally not currently used to convey information signals in a residential dwelling but, due to its capacity to accommodate a band width which is greater than that provided by coaxial cable and much greater than that provided by a plurality of twisted pairs cables, is advantageously included in the present invention.

It will be appreciated that the inclusion of optical fiber cables in the system of the present invention, as will be explained in more detail shortly, allows the system to convey a virtually unlimited amount of information, even much more than could be conveyed via a coaxial cable or twisted pair cables. Furthermore, the signal processor 172 can be devised to combine, modulate, and condition (using digital or analog techniques) any signals which enter the structure 102 via the junction box 104 or signals which originate within the structure, for example, a computer network or video disk player. Alternatively, the signal processor 172 can be devised to route signals using passive signal splitting techniques within the scope of the present invention. Thus, the system has the advantage of taking whatever information which is presented to at the junction box 104 and disseminating the information to one or more of any of the enclosures (148, 150, 152, 154, 156, 158, 160, 162, 164, 166, 168, and 170). Moreover, the system can also gather and disseminate information signals generated within the structure 102 as will understood from the information set forth herein.

In the preferred embodiment represented in FIGS. 2A and 2B the telephone signals which are input to the signal processor 172 are output to a set of twisted pair connectors represented generally at 116 via twisted pair cable 110A. The twisted pair connectors 116 (116A–I) are preferably eight (8) conductor female connectors which comply with the EIA/TIA (Electronics Industry Association/ Telecommunications Industry Association) standard promulgated in the Technical Systems Bulletin (TSB) 36 as Category 5 and refereed to in the industry as "CAT5." The EIA/TIA TSB 36 is incorporated herein by reference. It will be appreciated that the CAT5 standard requires that the connectors 116, wires attached to the connectors 116, and other characteristics of the media meet criteria which conventional wisdom treats as superfluous for conveying telephone signals. In contrast to conventional wisdom, the present invention incorporates twisted pair cables which provide far better transmission characteristics than called for by conventional wisdom in the residential dwelling industry. The described connectors, as with all the connectors described in connection with the present apparatus, are commercially available devices which preferably snap into apertures formed in a front panel 142 to allow for convenient fabrication of the apparatus 100.

Still referring to FIGS. 2A and 2B, television signals which are input to the signal processor 172 are output to a plurality of coaxial cable connectors represented generally at 114 (114A–L) via a coaxial cable 108A. The coaxial cable connectors 114 are preferably those which comply with the known industry standard referred as "RG6." The plurality of coaxial cable connectors 114 are interconnected to send signals downstream to other devices which are located in each of the enclosures (148, 150, 152, 154, 156, 158, 160, 162, 164, 166, 168, and 170).

Also represented in the preferred embodiment of FIGS. 2A and 2B are a plurality of fiber optic connectors generally represented at 112 (112A–G) and 113 (113A–G). The fiber optic connectors 112 are those which preferably send signals downstream to other devices. The fiber optic connectors 113 are those which preferably receive signals which are sent by other devices in the structure 102 and convey those signals to the node zero. It will be appreciated that the bandwidth of optical fiber cable is great enough to allow optical fibers, or in some cases only a single optical fiber, to convey all of the information signals which may be desired in the structure using appropriate modulation techniques in the signal processor 172 and demodulation techniques at each enclosure (148, 150, 152, 154, 156, 158, 160, 162, 164, 166, 168, and 170).

The optical fiber connectors 112 and 113, as well as all of the optical fiber connectors described herein are preferably those available in the industry and known as "ST" style connectors, although other connectors, such as those known in the industry as "SC," "SM," "FSD," "RSD," & "MM" styles can also be used within the scope of the present invention. The optical fiber connectors 113 communicate with the signal processor 172 via fiber 106A. Also represented in FIGS. 2A and 2B is a set of twisted pair, coaxial, and fiber connectors 117A–F which connected to the signal processor 172 via connection 106A and which can carry out many functions but which are particularly adapted to provide a connection to media provided by a utility company such as an electric utility, gas utility, telephone, cable television or other utility provider.

Between each enclosure (148, 150, 152, 154, 156, 158, 160, 162, 164, 166, 168, and 170) and the apparatus 100 there is strung a bus preferably comprising two optical fibers, two coaxial cables, and two twisted pair cables. Exemplary of the bus which is strung between the apparatus 100 and each of the enclosures (148, 150, 152, 154, 156, 158, 160, 162, 164, 166, 168, and 170) is that which is detailed between a first set of connectors, represented generally at 118, and a first enclosure 148. Each of the enclosures (148, 150, 152, 154, 156, 158, 160, 162, 164, 166, 168, and 170) preferably represent rooms in residential dwelling such as a home office, bed rooms, home theater, family room, and kitchen.

As represented in FIGS. 2A and 2B, two twisted pair cables 178A and 178F are strung from the first enclosure 148 and are individually connected to twisted pair connectors 118A and 118F, respectively. The twisted pair cables 178A and 178F and the corresponding connectors 118A and 118F preferably comply with the CAT5 standard described earlier. Two optical fibers are also strung from the first enclosure 148 and are individually connected to fiber optic connectors 118B and 118E, respectively. Two coaxial cables 117C and 117D are also strung from the first enclosure 148 and are individually connected to coaxial cable connectors 118C and 118D, respectively. The coaxial cables 117C and 117D and the corresponding connectors 118C and 118D preferably comply with the RG6 standard as described earlier. The twisted pair cables 117A and 117F, the optical fiber cables 117B and 117E, and the coaxial cables 117C and 117D collectively form a set of information conveying media and are referred to herein as a "bus." Each set of media which is strung between the enclosures (148, 150, 152, 154, 156, 158, 160, 162, 164, 166, 168, and 170) and the apparatus 100 preferably follows the same pattern as was just described in connection with bus 178. Thus, rather than the detail of the connections being represented, only the bus between each enclosure (comprising cables A–F) and the set of connectors on the apparatus 100 is represented in the case of the remaining enclosures.

The bus connection between each of the enclosures and the sets of connectors on the apparatus 100 are set forth in Table A. It will be appreciated that the information set forth in Table A is merely exemplary and many other arrangements of the present invention can be devised by those skilled in the art using the information set forth herein.

TABLE A

| Enclosure | Bus | Set of Connectors |
| --- | --- | --- |
| 148 | 178 (A–F) | 118 |
| 150 | 180 (A–F) | 120 |
| 152 | 182 (A–F) | 122 |
| 154 | 184 (A–F) | 124 |
| 156 | 186 (A–F) | 126 |
| 158 | 188 (A–F) | 128 |
| 160 | 190 (A–F) | 130 |
| 162 | 192 (A–F) | 132 |
| 164 | 194 (A–F) | 134 |
| 166 | 196 (A–F) | 136 |
| 168 | 198 (A–F) | 138 |
| 170 | 200 (A–F) | 140 |

Figure 3:
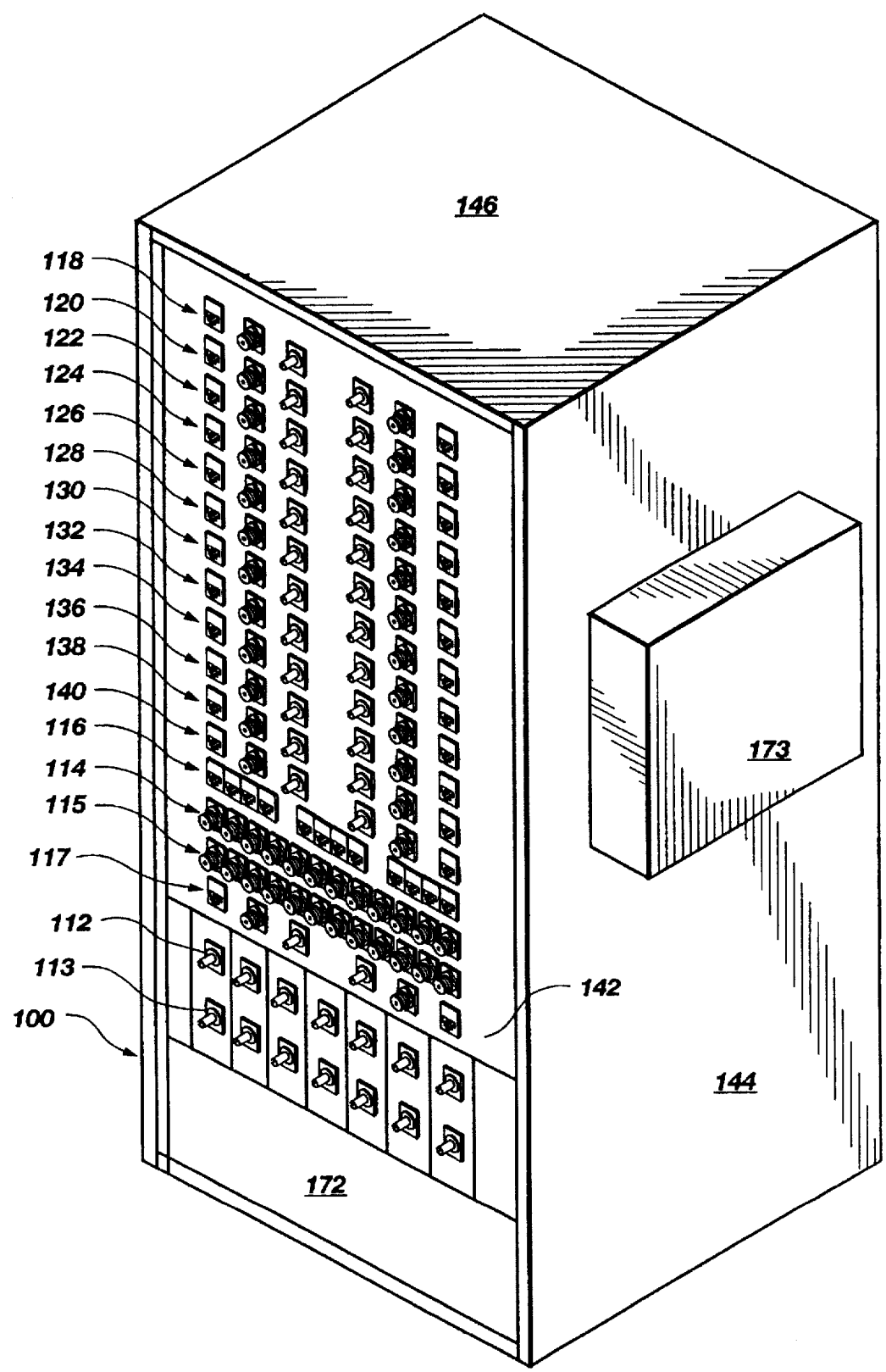
FIG. 3 is a perspective view of a portion of the first embodiment represented in FIGS. 2A and 2B.

Reference will next be made to FIG. 3 which is a perspective view of the apparatus 100 which has been installed in a cabinet, or other housing, which includes the front panel 142, a side panel 144, and a top panel 146, to conveniently function as one available means for supporting the other components of the apparatus. By comparing the prior art approach represented in FIG. 1 to the apparatus 100 of the present invention represented in FIG. 3, the advantages of simplicity, reliability, reduced cost, and compactness provided by the present invention will be appreciated. The housing for the apparatus can be mounted on a wall, sit on a floor, or placed in another suitable location.

It is also preferred that the sets of connectors (118, 120, 122, 124, 126, 128, 130, 132, 134, 136, 138, and 140) each be color coded for ease of use. For example, the connectors in each vertical column of connectors illustrated in FIG. 3 can have a particular color associated therewith. Moreover, each set of connectors (118, 120, 122, 124, 126, 128, 130, 132, 134, 136, 138, and 140) is divided into two groups, with each group including three connectors. One group of three connectors is preferably referred to as "Interactive A" with the other group of three connectors preferably referred to as "Interactive B" indicating their potential function. Such color coding and references further improve the convenience and utility of the embodiments of the present invention. This is in contrast to the haphazard and confusing arrangements which are often found in the prior art which are not only difficult to install but which are complex and perplexing to trouble shoot when problems arise and to modify when changes are necessary.

Also represented in FIG. 3 is a telephone system control box 173, such as those which are available in the art, which can be integrated into the apparatus using the information set forth herein. The telephone system integrated into the apparatus 100 can be any one of a number of telephone systems available in the industry. The apparatus of the present invention can accommodate old style telephone systems as well as the modern digital and analog telephone systems. Moreover, it will be appreciated by those skilled in the art that an intruder detection system, i.e., a building alarm system, as is available in the art, can also be readily integrated into the apparatus of the present invention. Still further, automated lighting control systems, intercom systems, and home automation systems can also be readily incorporated into the apparatus of the present invention. It is also within the scope of the present invention to mount each set of connectors (118, 120, 122, 124, 126, 128, 130, 132, 134, 136, 138, 140, 116, 115, 112, and 113) on a separate panel segment so that the each set of connectors or components can be readily replaced as a group.

It will be appreciated that the present invention advantageously allows additional features and equipment to be readily added. For example, the structure of the present invention allows telephone, alarm, and television devices to be readily added or changed. Moreover, access to any communication media leading to any enclosure in the structure can be made instantly. Even further, any necessary connection to be made to the information conveying media can be made at a central location.

Figure 4:
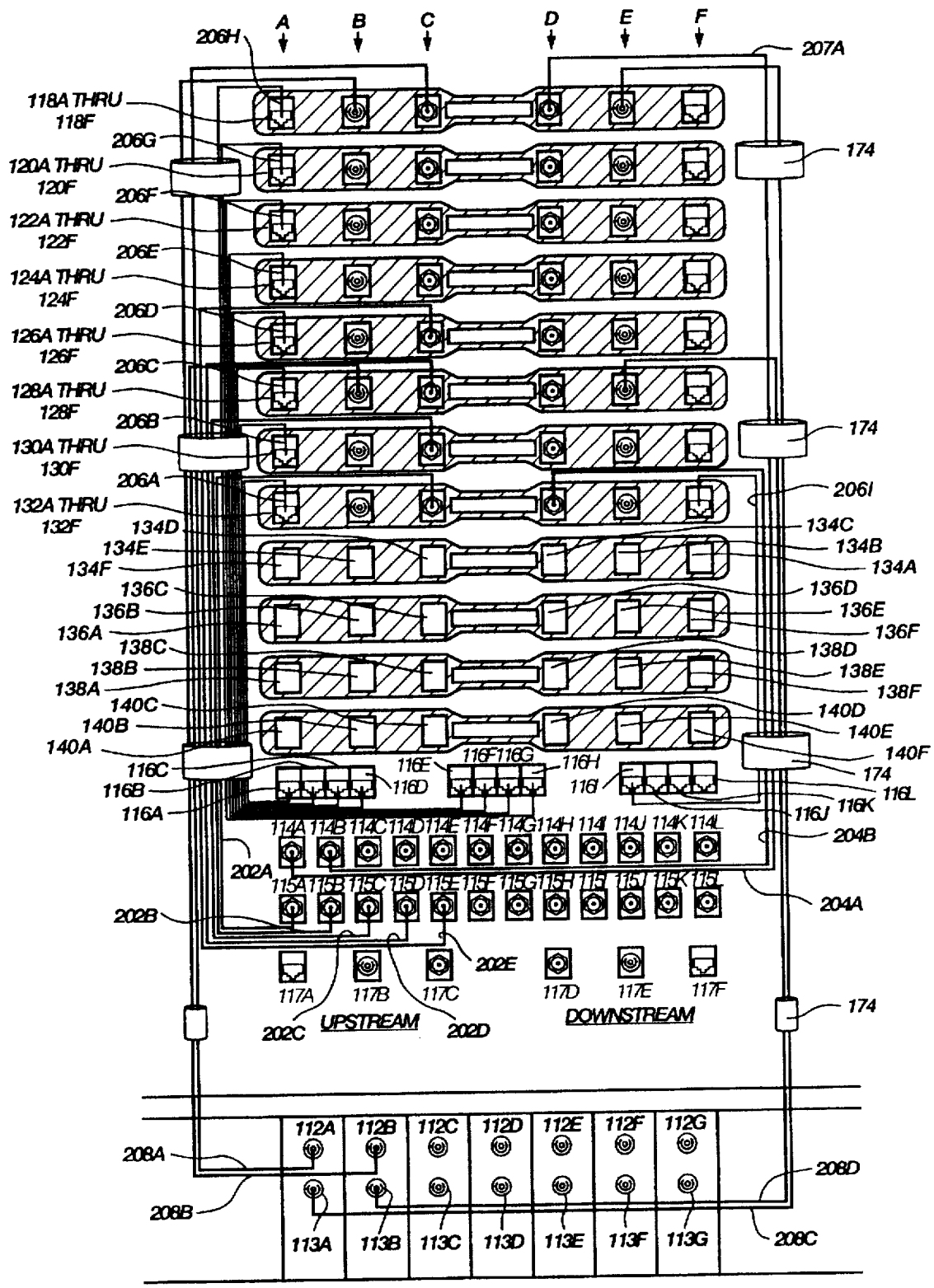
FIG. 4 is a front plan view of the first embodiment represented in FIG. 3.

Reference will next be made to FIG. 4 which is a plan front view of the apparatus 100 represented in FIGS. 2A and 2B with exemplary interconnections made which convey information signals from one point to another in the structure. It will be noted that some of the wire restraining devices represented in FIG. 4 are indicated at 174. Moreover, in FIG. 4 not all connectors have been used and some connectors have not been installed in the panel.

In the example represented in FIG. 4, interconnections have been made as indicated in Table B, Table C, and Table D. All of the interconnections are made using components which will maintain the integrity of the information signal carried thereon. For example, the interconnections involving twisted pair cables should adhere to the CAT5 standard while the coaxial cable and optical fiber interconnections should meet appropriate respective standards.

Set forth below in Table B are the interconnections represented in FIG. 4 involving twisted pair cables. It will be appreciated that the information set forth in Table B is merely exemplary and many other arrangements of the present invention can be devised by those skilled in the art using the information set forth herein.

TABLE B

| Connector | Interconnect | Connector |
| --- | --- | --- |
| 116A | 206A | 118A |
| 116B | 206B | 120A |
| 116C | 206C | 122A |
| 116D | 206D | 124A |
| 116E | 206E | 126A |
| 116F | 206F | 128A |
| 116G | 206G | 130A |
| 116H | 206H | 132A |
| 116I | 206I | 132E |

In the case of the preferred embodiment represented in FIG. 4, the interconnections indicated in Table B provide telephone signals to the enclosures (e.g., rooms) indicated in FIGS. 2A and 2B as 148, 150, 152, 154, 156, 158, 160, and 162. In the case of enclosure 162, two interconnections are provided which can convey telephone signals or any other information signal which can be conveyed using the twisted pair cables.

Set forth below in Table C are the interconnections represented in FIG. 4 involving coaxial cable. It will be appreciated that the information set forth in Table C is merely exemplary and many other arrangements of the present invention can be devised by those skilled in the art using the information set forth herein.

TABLE C

| Connector | Interconnect | Connector |
|---|---|---|
| 114A | 204A | 118D |
| 114B | 204B | 132D |
| 115A | 202A | 132C |
| 115B | 202B | 130C |
| 115C | 202C | 126C |
| 115D | 202D | 128C |
| 115E | 202C | 130C |

In the case of the preferred embodiment represented in FIG. 4, the interconnections indicated in Table C provide television signals from the apparatus 100 to the enclosures (e.g., rooms) indicated in FIGS. 2A and 2B as 148, 156, 158, 160, and 162. In the case of enclosures 148 and 162, television signals are conveyed to the apparatus 100 via connectors 114A and 114B where they are processed by the signal processor 172 and conveyed back to connectors 115A-E where other enclosures can receive such television signals as well as other television signals which may arrive from external sources.

Set forth below in Table D are the interconnections represented in FIG. 4 involving optical fiber. It will be appreciated that the information set forth in Table D is merely exemplary and many other arrangements of the present invention can be devised by those skilled in the art using the information set forth herein.

TABLE D

| Connector | Interconnect | Connector |
|---|---|---|
| 112A | 208A | 128B |
| 112B | 208B | 118B |
| 113A | 208C | 118E |
| 113B | 208D | 128E |

In the case of the preferred embodiment represented in FIG. 4, the interconnections indicated in Table D provide two independent fiber optic connections between the apparatus 100 and the enclosures (e.g., rooms) indicated in FIGS. 2A and 2B as 148 and 158. It will be appreciated that while the first preferred embodiment of the present invention has been explained using typical applications such as conveying telephone signals and television signals, any of the media can be used to convey whatever information signals which are compatible with the media. For example, digital data can be conveyed via twisted pair cable, coaxial cable, or optical fiber cable. Furthermore, the embodiments of the present invention can be readily expanded to include many different media provided within the structure and to receive information from many different media routed outside of the structure. The inclusion of optical fiber in the system of the present invention provides the advantage of allowing any type of information signal which may become common in the future to be accommodated due to the great bandwidth and immunity from interference which is provided by optical fiber. Moreover, optical fiber media provides the advantage of greater security from eavesdropping than other media.

Figure 4A:
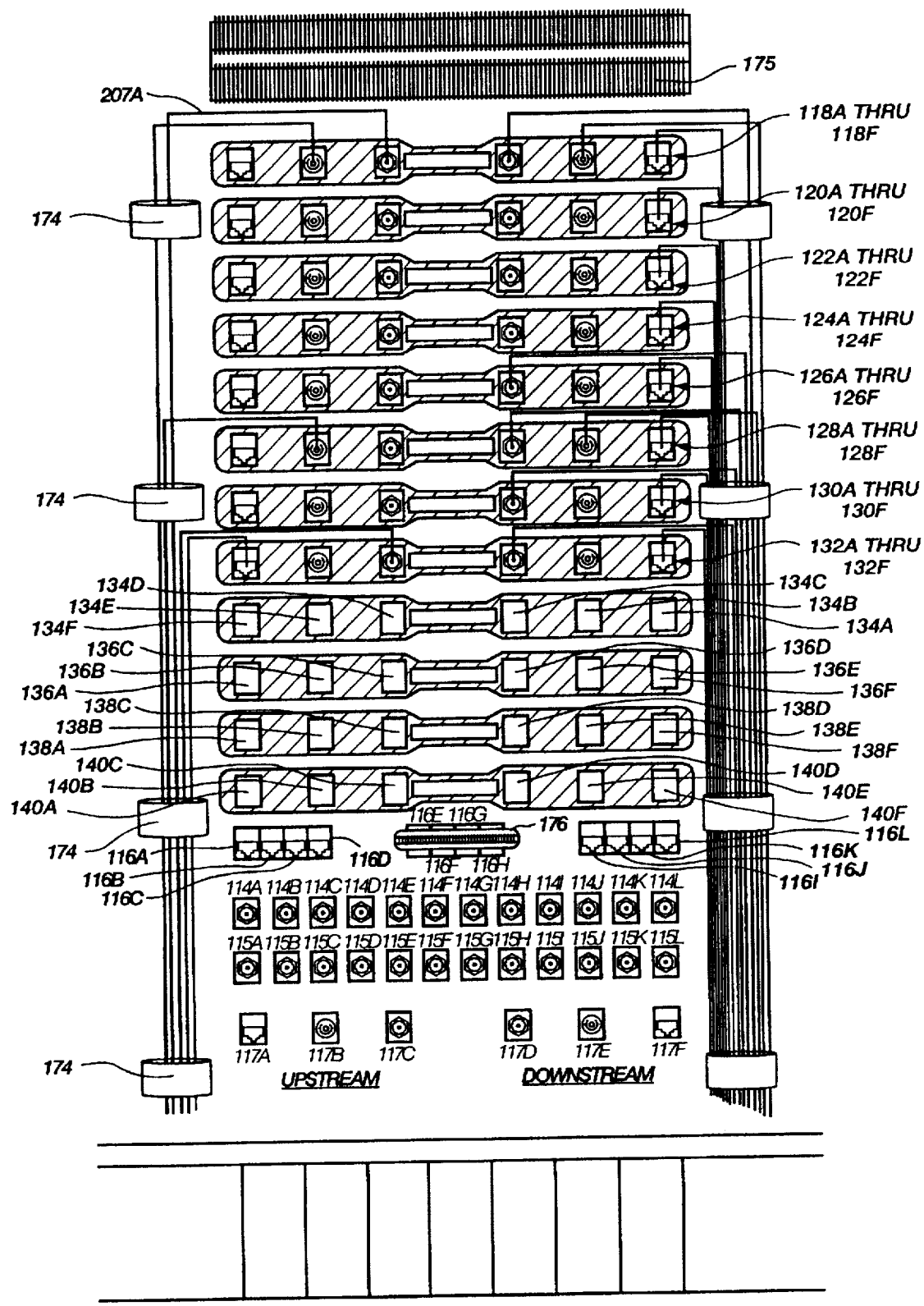
FIG. 4A is back plan view of the first embodiment represented in FIG. 4.

Reference will now be made to FIG. 4A which is a back plan view of a portion of the first embodiment represented in FIG. 4. FIG. 4A shows the cables which lead from the apparatus 100 to the enclosures or rooms (148, 150, 152, 154, 156, 158, 160, 162, 164, 166, 168, 170) represented in FIGS. 2A and 2B. FIG. 4A shows the logical and neat organization of the cables which are easy to identify and are held in place by wire restraining devices 174. This is in contrast to the prior art practice which leaves long lengths of disorganized cable (which are difficult to identify and trace) on the floor in a utility room.

FIG. 4A shows the reverse side of the sets of connectors (the front side of which are generally represented as sets of connectors 118A-F, 120A-F, 122A-F, 124A-F, 126A-F, 128A-F, 130A-F, 132A-F, 134A-F, 136A-F, 138A-F, and 140A-F in FIGS. 2A and 2B). All of the cables and connectors shown in the reverse side view of FIG. 4A should also meet the appropriate standards discussed herein.

Also represented in FIG. 4A is a terminal strip 175 which is included to make convenient connections (not represented) between some devices, such as telephone system control box (173 in FIG. 3) or intruder detection system which require the use of a terminal strip. The terminal strip 175 is preferably of a type which is well-known in the industry.

Also represented in FIG. 4A is an adaptor 176 which has been fabricated in accordance with the present invention. The adaptor 176 provides a structure to convey telephone signals presented on a connector referred to in the art as an "Amphenol" connector (not represented in FIG. 4A) to the CAT5 connectors included in the apparatus 100. It will be appreciated that the adaptor 176 is structured to convey one or more telephone signals to each of the twisted pair connectors 116A-L. As is known in the art, some telephone systems require only two conductors to convey a telephone signal while some telephone systems require four or more conductors. Since each twisted pair connector 116A-L (and twisted pair cables strung to the rooms) includes eight conductors, the adaptor 176 can be optionally structured to convey one, two, three, or four telephone signals on each twisted pair cable. Thus, the adaptor can be advantageously structured to convey several telephone or other information signals along a signal twisted pair cable.

Figure 4B:
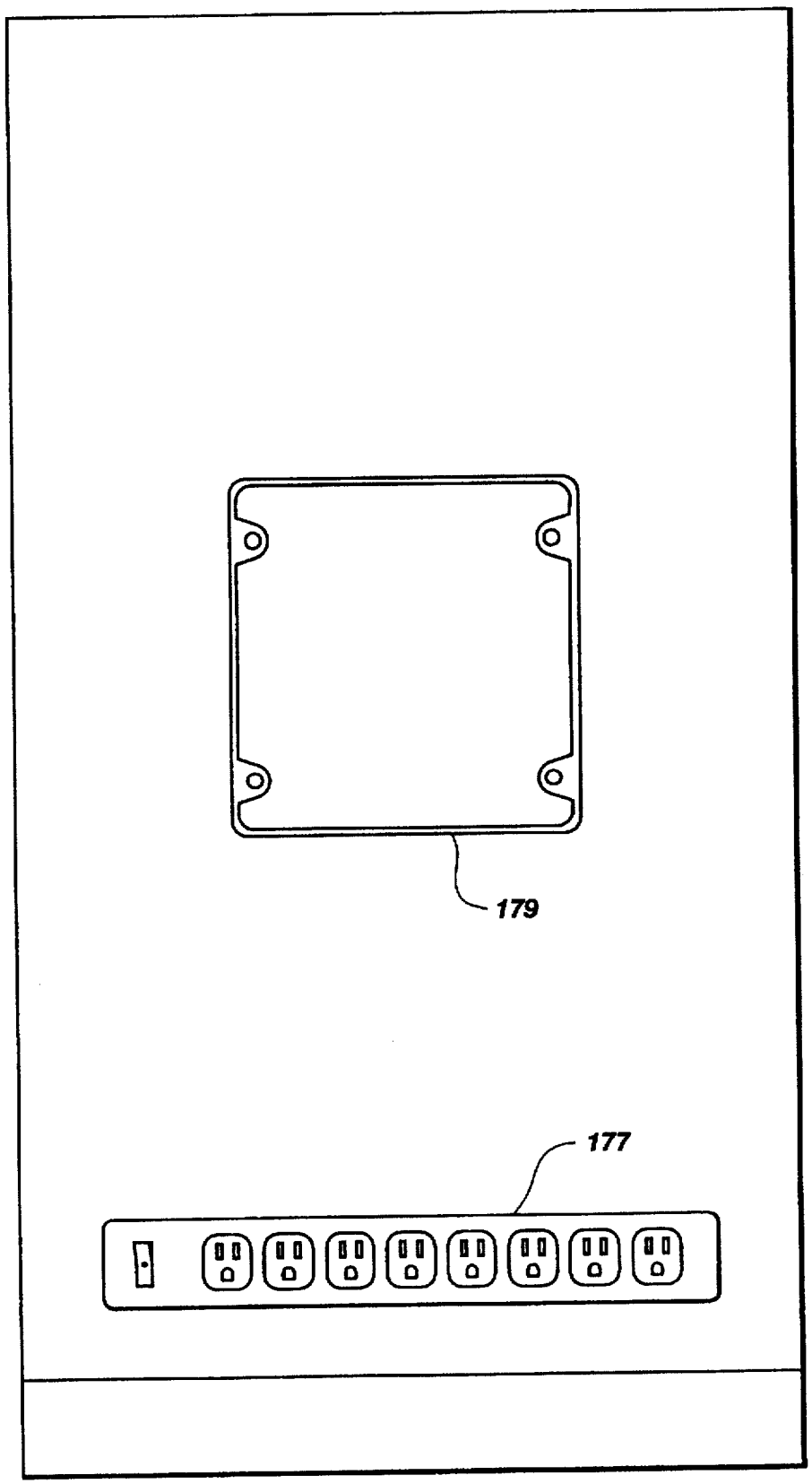
FIG. 4B is an interior plan view of back side of the cabinet illustrated in FIG. 3.

Reference will now be made to FIG. 4B which is an interior plan view of the back side of the embodiment illustrated in FIG. 3. Represented in FIG. 4B is a plurality of NEMA compatible receptacles which are arranged in a structure commonly referred to in the industry as a power strip 177. The power strip is connected to the AC power bus (not represented in FIG. 4B) of the structure in which the apparatus 100 is installed. The power strip 177 is used to convey AC power to various devices associated with the apparatus 100. The power strip 177 is also used as a location to place modulated information carrying signals onto the AC power bus. As is known in the art, devices are available, and standards have been promulgated, which transmit modulated information signals on the AC power bus. It is within the scope of the present invention to incorporate such devices.

Also represented in FIG. 4B is a mud ring 179. The mud ring 179 functions to allow passage of the plurality of cables making up the buses (which lead to the various rooms) to pass through the wall board (not represented in FIG. 4B) next to which the apparatus 100 is placed. The mud ring 179 protects the edge of the wall board and the mud ring 179 allows the cables to be readily passed through the wall and connected to the apparatus 100.

Figure 4C:
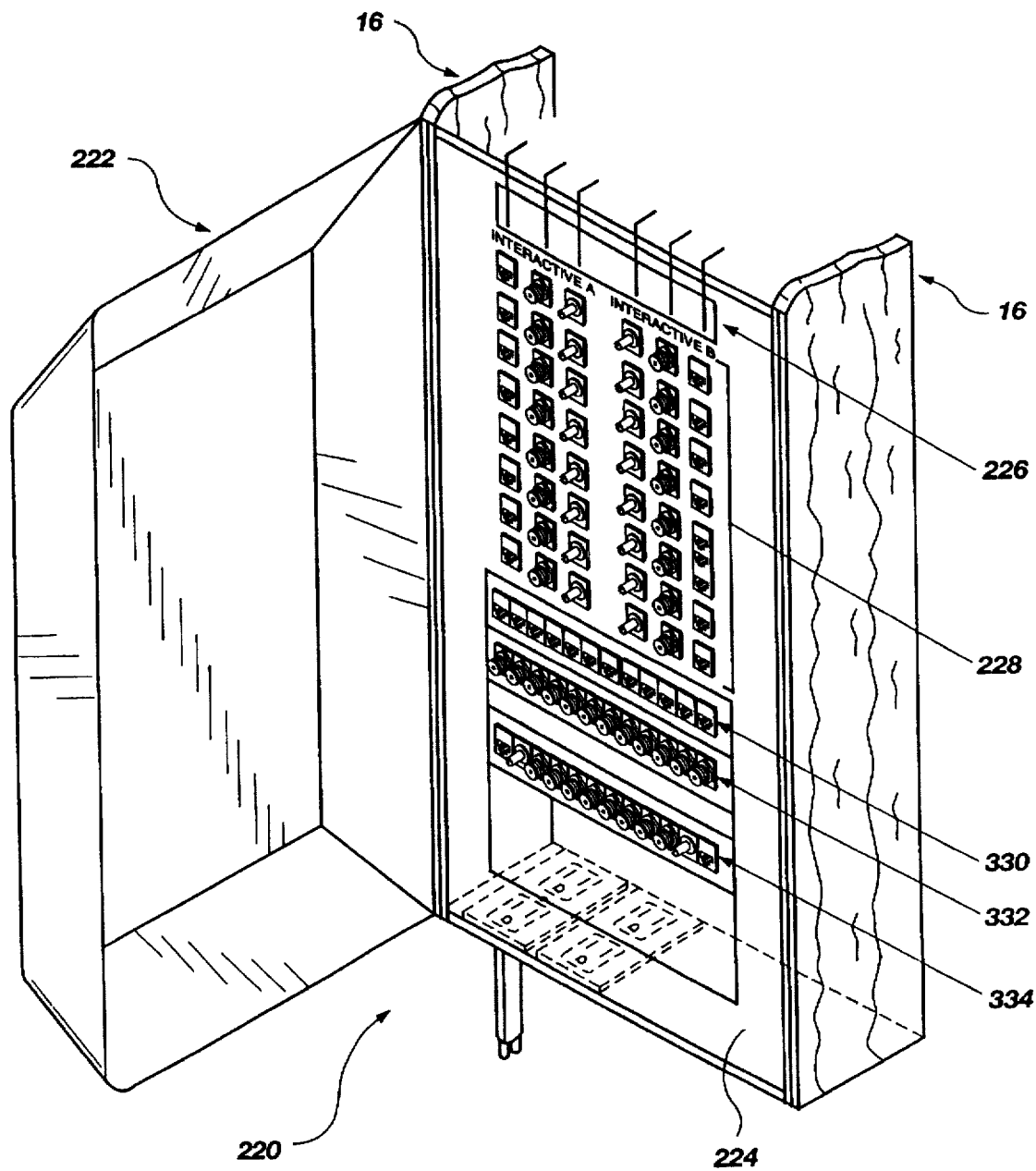
FIG. 4C is a perspective view of another embodiment of the present invention.

Reference will next be made to FIG. 4C. FIG. 4C is a perspective view of another preferred embodiment, generally represented at 220, of the electronic information distribution apparatus of the present invention. The apparatus 220 represented in FIG. 4C is particularly adapted for installations requiring less information distribution capacity than the previously described embodiment 100. The apparatus 220 is preferably installed in a wall cavity between two studs 16 as are commonly present in conventional construction.

The apparatus 220 includes a terminal strip generally represented at 226, eight sets of connectors generally represented at 228, a set of twisted pair cable connectors generally represented at 330 which preferably function to distribute telephone signals, a set of coaxial cable connectors generally represented at 334 which preferably function to distribute other signals (such as those provided by cable television and other utility companies and internal signal sources), and a set of connectors generally represented at 334 which function to receive information signals provided by any available sources. All of the connectors (226, 228, 330, 332, and 334) are supported on a panel 224. A cover 222 is provided which hingably opens and closes over the panel 224. The cover 222 allows the apparatus 220 to be installed in a location such as a hall or closet (not represented) in FIG. 4C). The cover 222 is generally dome shaped to accommodate the interconnecting cables (not represented) when the cover 222 is closed.

Figure 5:
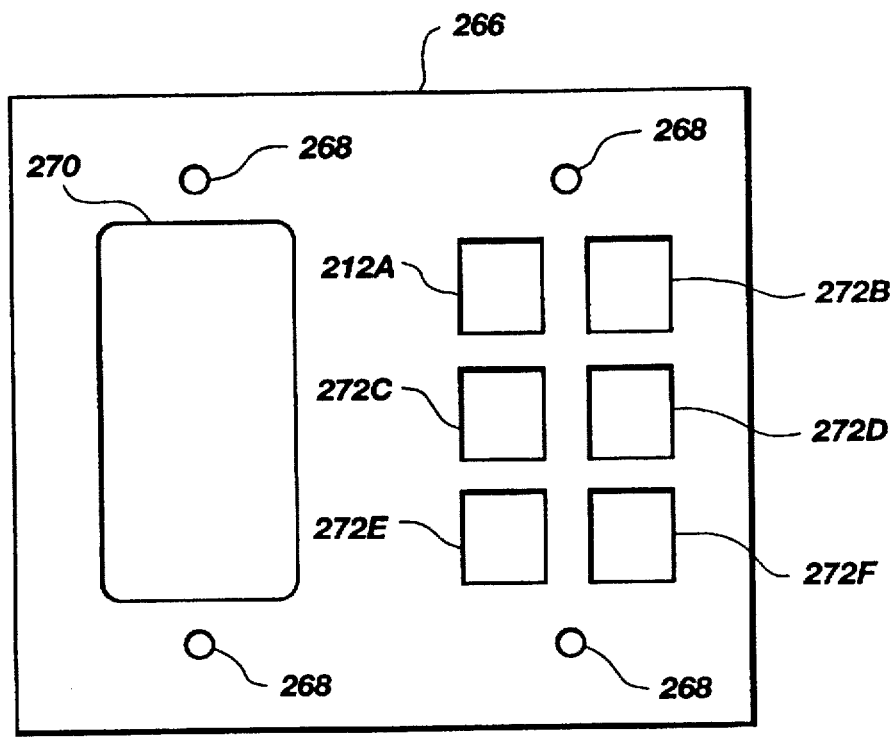
FIG. 5 is a front elevational view of a portion of a second embodiment of the present invention.
Figure 6:
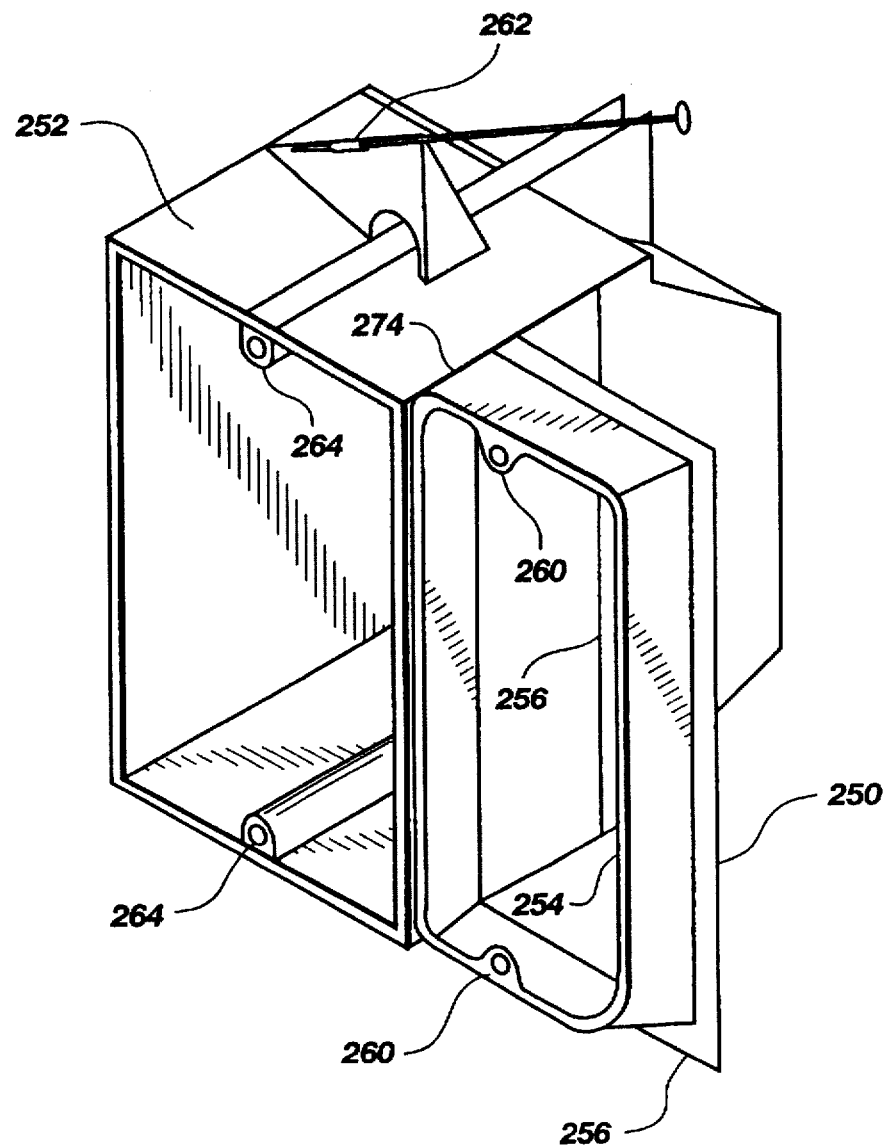
FIG. 6 is a perspective view of a cable connection holder preferably included in the second embodiment of the present invention.

Reference will next be made to FIG. 5 which is a perspective view of a portion of a second presently preferred embodiment of the present invention. As explained above, each room or enclosure in a structure is preferably provided with two twisted pair cables, two coaxial cables, and two optical fibers. Not only is there no recognition in the prior art to include the above-described bus arrangement to each room, but there is no suggestion in the art to provide a convenient and efficient structure to allow connections to be made to all of such cables in each of the rooms of the residential dwelling. Moreover, in contrast to the prior art, the present invention allows information to be conveniently disseminated from one room to another room (or rooms) in the structure or even to a recipient outside of the structure such as a utility company providing a connection to the apparatus. FIGS. 5 and 6 will be used to explain how the second presently preferred embodiment of the present invention carries out the function of providing a compact device to connect devices which may be present in the room to one or more of the buses.

Represented in FIG. 5 is a plate which provides high density packaging of connectors which are connected to the two twisted pair cables, two coaxial cables, and two optical fiber cables strung to each room as represented in FIGS. 2A and 2B. Once again the present invention has particular application in a residential dwelling but may also be used in many other applications. It will be appreciated that residential dwellings will in the future require support for devices such as computer networks, phone systems, fax machines, modems, CCTV, appliance automation systems, lighting control systems, power line controllers, audio/video signals, control systems and numerous other electronic devices.

Represented in FIG. 5 is a plate 266 which includes an aperture 270, the aperture 270 accommodating a NEMA standard wiring device, and six adaptable apertures 272A-F. As used herein the term "wiring device" means any device which receives energy via a cable or wire and include both passive and active devices which are now available in the industry and those which may become available in the future. The plate 266 rests flush on the surface of a wall where access to the bus is needed. Each of the adaptable apertures 272A-F can accommodate one twisted pair cable connector, one coaxial cable connector, or one optical fiber connector (not illustrated in FIG. 5) such as those described earlier in connection with FIGS. 2-4. Thus, the plate 266 can accommodate any combination of up to six twisted pair connectors, coaxial cable connectors, and/or optical fiber connectors. The holes 268 are provided to allow screws or bolts (not illustrated) to attach the plate 266 to an electrical box as will be explained next.

Figure 6A:
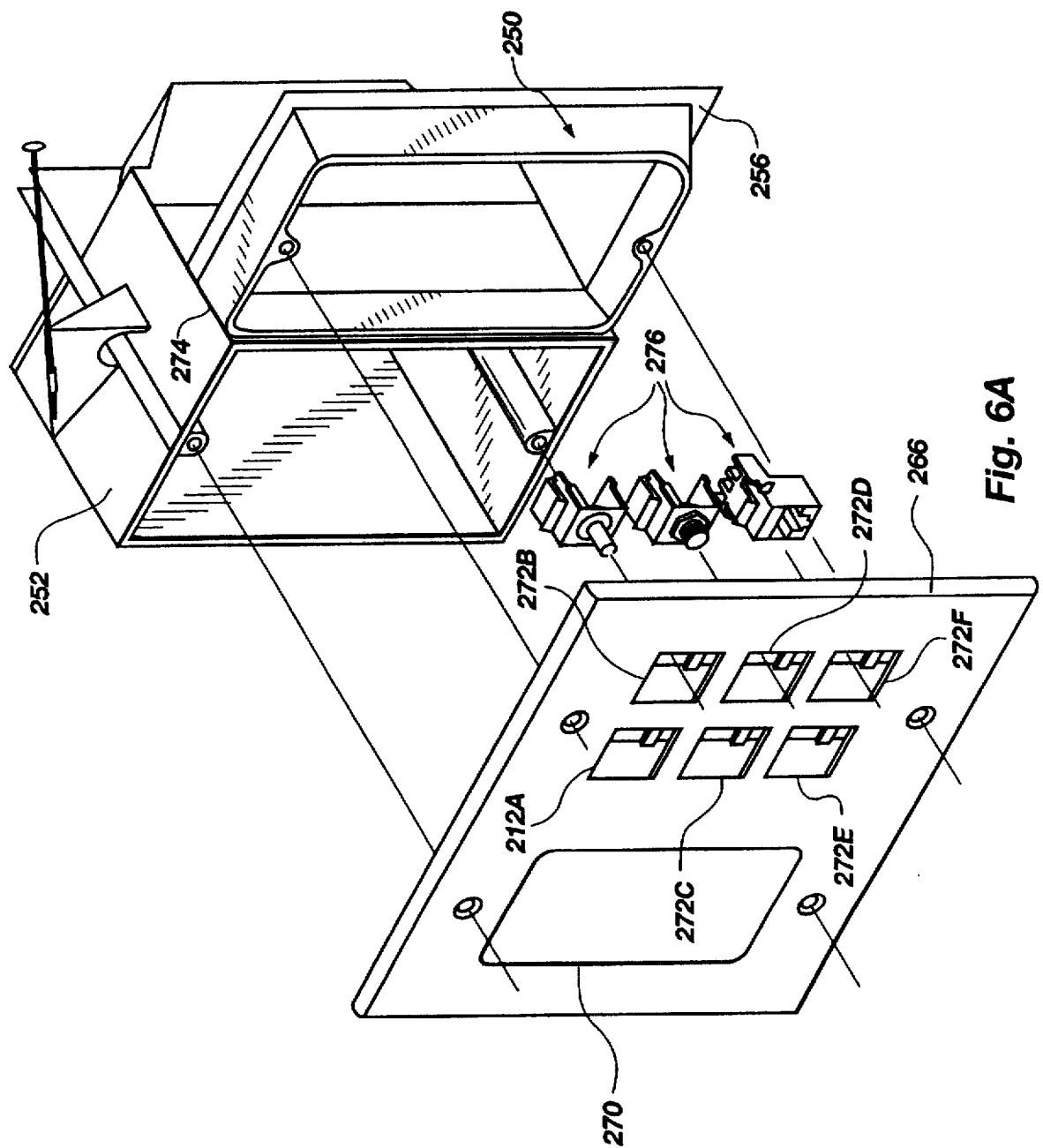
FIG. 6A is an exploded perspective view of the structures represented in FIGS. 5 and 6.

FIG. 6 provides a perspective view of the portion of the second embodiment which is installed within the wall of the room. Indicated at 252 is an electrical box which is dimensioned in accordance with customary industry standards and as available in a plastic or metal material in the industry. A fin 262 is often provided on the box 252 to receive a nail or a screw by which the box is attached to a building structure element (not represented) as known in the art. Two bores 264 are provided to receive screws or bolts to hold the plate 266 (FIG. 5) in place. FIG. 6A provides an exploded perspective view of the structures represented in FIGS. 5 and 6 with cable connectors, generally designated at 276, ready to be inserted into the plate 266.

In contrast to the present invention, the prior art approach is to feed twisted pair cables, coaxial cables, and optical fibers through a standard electrical box such as that represented at 252 in FIG. 6. Disadvantageously, use of a the standard electrical box 252 poses several problems. For example, coaxial cable and twisted pair cable do not easily fit into an enclosed electrical box. Damaging kinks can occur in the cables during the installation process or when wall board is installed around the electrical box 252 since it can be very difficult to roll the cables back into the electrical box 252 during the "rough-in" phase of dwelling construction. Moreover, when the hole is being cut in wall board to fit the electrical box 252, such as when a power tool is used as known in the industry, the cables may be damaged.

All of these drawbacks are aggravated when optical fibers are used. Because of the limited bend radius of optical fibers, the prior art closed electrical box 252 makes it difficult or impossible to roll the loose optical fiber cable into the electrical box 252 while wall board is being installed. While optical fiber cable is surprisingly strong and tough, bend radius limitations should not be exceeded by stuffing the optical fiber cable into the electrical box 252 during installation of the wall board or damage will result. Even after the installation of wall board on a wall, the closed construction of the standard electrical box 252 makes installing cable difficult because the cables push against the back side of the box and, particularly in the case of optical fiber cable, may result in damage to the fiber or cable.

Furthermore, some attempts have been made to attach a separate closed electrical box, which can receive information carrying cables, to the standard electrical box 252. Such approaches have experienced problems such as: the separate box breaking off when the wall board is installed; the separate box irretrievably falling within the wall cavity; the cover plate being difficult or impossible to correctly install; and the separate box does not lay flush with the surface of the wall. The apparatus described herein overcomes all of these problems.

It will be appreciated that the connectors used in the apparatus represented in FIGS. 2-4 can also be used in the plate 266 (FIG. 5). Thus, the desired connectors can be inserted into the adaptable apertures 272A-F in accordance with the particular needs at each site. It is within the scope of the present invention to include additional wiring device apertures 270 of the same or different configuration or to include additional adaptable apertures 272A–E. Thus, the connectors can be installed in the plate 266 to accommodate two voice phone lines, a modem phone line, and a fax line using adaptable apertures 272A–D with the remaining two adaptable apertures 272E–F being filled with appropriate "blanks." Thus, when necessary, additional connectors can be attached to, for example, the optical fibers present at the plate 266 but not yet used.

Referring still to FIG. 6, in order to facilitate use of the previously mentioned cables, and particularly optical fibers, the second embodiment of the present invention includes a mounting frame generally indicated at 250 which overcomes the problems associated with the prior art separate boxes. The mounting frame 250 has an open back as indicated generally at 258. The mounting frame 250 is preferably attached to the electrical box 252 by a double sided adhesive tape 274. Other structures, such flexible fingers that extend from the electrical box 252 or from the perimeter 254 of the mounting frame 250, can also be used to attach the mounting frame to the electrical box 252. Bores 260 are provided to receive screws or bolts to hold plate 266 (FIG. 5) in place. It will be appreciated that is also within the scope of the present invention to adhere or attach the mounting frame 250 directly to structural building members.

Importantly, the open back construction of the mounting frame 250 allows more room for cables, particularly optical fiber cables, to bend. During installation of wall board, the cables are left inside the cavity of the wall and can be pulled through the opening 258 of the mounting frame 250 when connectors (not shown) are installed. Moreover, with the open back construction, ample space is provided to accommodate the bend radius of cables and particularly optical fibers. If desired, extra cable can be left inside of the cavity of a wall to accommodate future expansion. A cable restraining device (not shown) can optionally be included on the mounting frame 250 for holding the cables in place and relieving strain on the connectors which are installed in the adaptable apertures 272A–F.

Still referring to FIG. 6, a flange 256 is provided around three sides of the mounting frame 250 which prevent the mounting frame from being pulled through the wall board. Thus, when screws are tightened through holes 268 (FIG. 5) into bores 264, the mounting frame 250 is held behind the wall board (not shown) and the plate 266 can be tightened against the wall (not shown) securing both the mounting frame 250 and the plate 266 in place.

It will be appreciated that the mounting frame 250 can be used both in new construction and to retrofit existing structures. In the case of retrofitting an existing structure, after a rectangular hole is cut in the wall board next to an existing electrical box, the mounting frame 250 can be slipped into the hole on its side, rotated 90 degrees, and adhered to the existing electrical box. The cables can then be fished into place, as known in the art, and the cables attached to appropriate connectors and the plate 266 installed. The flange 256 holds the mounting frame 250 behind the wall board and the perimeter 254 of the mounting frame 250 extends close to the edge of the sheetrock. In accordance with the National Electrical Code (NEC), the perimeter should be set back no farther than ¼" from the surface of the wall so different sizes of mounting frames 250 are preferably provided for differing thicknesses of wall board.

While the plate 266 is one preferred arrangement for holding cable connectors in a convenient wall-mounted position, several drawbacks can be encountered in some situations. For example, the width of the electrical box 252 (FIG. 6) is not standard within the electrical industry and can vary significantly. Thus, as the width of the electrical box 252 varies, after the mounting frame 256 (FIG. 6) is attached the bores 260 and 264 (FIG. 6) do not properly align with the holes 268 provided in the plate 266 (FIG. 5) sometimes causing serious difficulty during installation. Moreover, when more than one or two cable connectors 276 are attached to the plate 266, the installation of the plate 266 can still be time consuming and difficult due to the stiffness of the cables and the care needed to avoid damaging the cables. Still further, the cables and connectors must be protected from damage due to cutting and painting while the wall is finished. Even further, if the mounting frame 254 is mounted on the side of the electrical box 252 opposite from that shown in FIG. 6A, the plate 266 must be installed upside down and the connectors, such as a RJ-xx series jack and SC fiber optic connectors, appear to a user to be upside down also since the twisted pair RJ-xx series jack can only be installed in plate 266 in a single orientation. The installation of connectors upside down is not desirable.

Figure 6B:
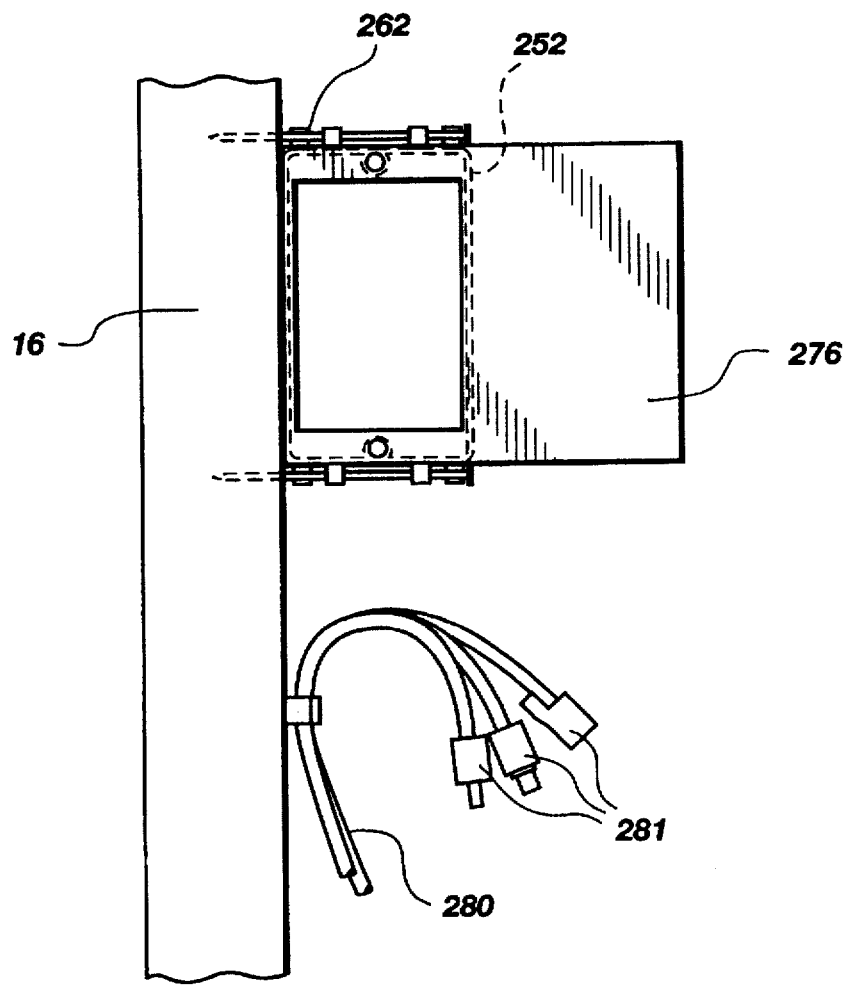
FIG. 6B shows another cable connection holder structure of the present invention.

Reference will next be made to FIGS. 6B–G to describe additional preferred structures used to hold cable connectors in a wall mounted position. FIG. 6B provides a front view of an existing electrical box 252 attached to a stud 16 by way of nails or screws 212. Also represented in FIG. 6B is a bundle of cables 280 which have been installed in the residential or commercial structure. The bundle of cables 280 is releasably held in place against the stud 16 by a grasp 278. The grasp 278 can preferably be a strip of hook and loop fastener which is nailed to the stud 16 or any other similarly functioning arrangement can be used within the scope of the present invention. It will be appreciated that the method and structure described in connection with FIGS. 6B–G works equally well if only a single cable is installed in contrast to a number of cables being included in the bundle of cables 280.

The bundle of cables 280 are positioned far enough away from the electrical box 252 so that there is no possibility that the cables will be damaged when a hole is cut from the wall board (not represented in FIG. 6B) to access the electrical box 252. With the present invention, the bundle of cables 280 are kept relaxed and are not subject to kinking which results when they are forced into a box. Moreover, the bundle of cables 280 are positioned so that after installation of the wall board the bundle of cables 280 is shielded from paint which is applied to the wall board. It is also within the scope of the present invention to provide a removable covering over the end of the bundle of cables 280 to provide further protection, however, such is often not required when using the structures herein described. Connectors may be attached to the ends of the cables either before or after the installation of wall board to the stud 16. Thus, the described arrangement protects the bundle of cables 280 from damage which might otherwise arise from the cutting of holes in the wall board and painting of the wall board.

Before the installation of wall board and the cutting of holes in the wall board to provide access to electrical boxes and other utilities, a template 276 is attached to the electrical box 252 preferably using screws inserted into bores 264. When attaching wall board to the stud using screws or nails, the electrical box 252 is generally used as a guide for a cutting tool by the wall board installer so that the hole which is cut in the wall board closely matches the shape and size of the electrical box 252 for a close fit thereto. The template 276 similarly acts as a guide for a cutting tool so that a properly sized hole can readily be made in the wall board to accommodate a holder for the connectors included on the bundle of cables 280 as will be described shortly. Advantageously, the template 276 allows the hole to be cut in the wall board in the same manner and at the same time as the hole in the wall board is cut for the electrical box 252. The template 276 is preferably removed after the hole is cut in the wall board. Alternatively, it is within the scope of the present invention to fabricate the template 276 so it can remain in place after installation of the cable connection holder as will now be described.

FIG. 6C provides a front view of a cover plate 282 in accordance with one aspect of the present invention. The cover plate 282 can be fabricated from metal, plastic, or any other suitable material. Provided in the cover plate 282 are apertures 287 which are exemplary of the apertures which accommodate NEMA wiring devices. It is to be understood that the apertures 287 are merely exemplary of the different wiring devices which can be accommodated.

In the embodiment illustrated in FIGS. 6B–F, six apertures 288A–F are also provided to allow access to the cable connectors, for example, the connectors 276 in FIG. 6A. Importantly, the cover plate 282 does not provide any structures to which the connectors 276 attach (as does cover 266 in FIG. 6A) but the connectors merely project into the apertures 288A–F. A plurality of screw holes 285 are provided to attach the cover plate 282 to the electrical box 252 and to other connector holding structures to be explained shortly. The screw holes 285 can have an oval shape to accommodate precise positioning of the cover plate 282. Importantly, using the structures described in connection with FIGS. 6B–G, the structures to which the cover plate 282 are attached can be beneficially precisely positioned so that the screw holes 285 can be of a circular, rather than oval, shape.

FIGS. 6D–E provide front and side views, respectively, of a capture plate 284 which functions to securely hold the connectors 276 in place. The connectors 276 can preferably be those which are available in the art and each of six, or some other number, of apertures 288A–F which are each shaped to securely hold the connectors which are inserted therein. The side view of FIG. 6E shows the offset of the apertures 288A–F which provide that the connectors, when secured therein, to properly project into each of the apertures 183A–F (FIG. 6C).

Figure 6F:
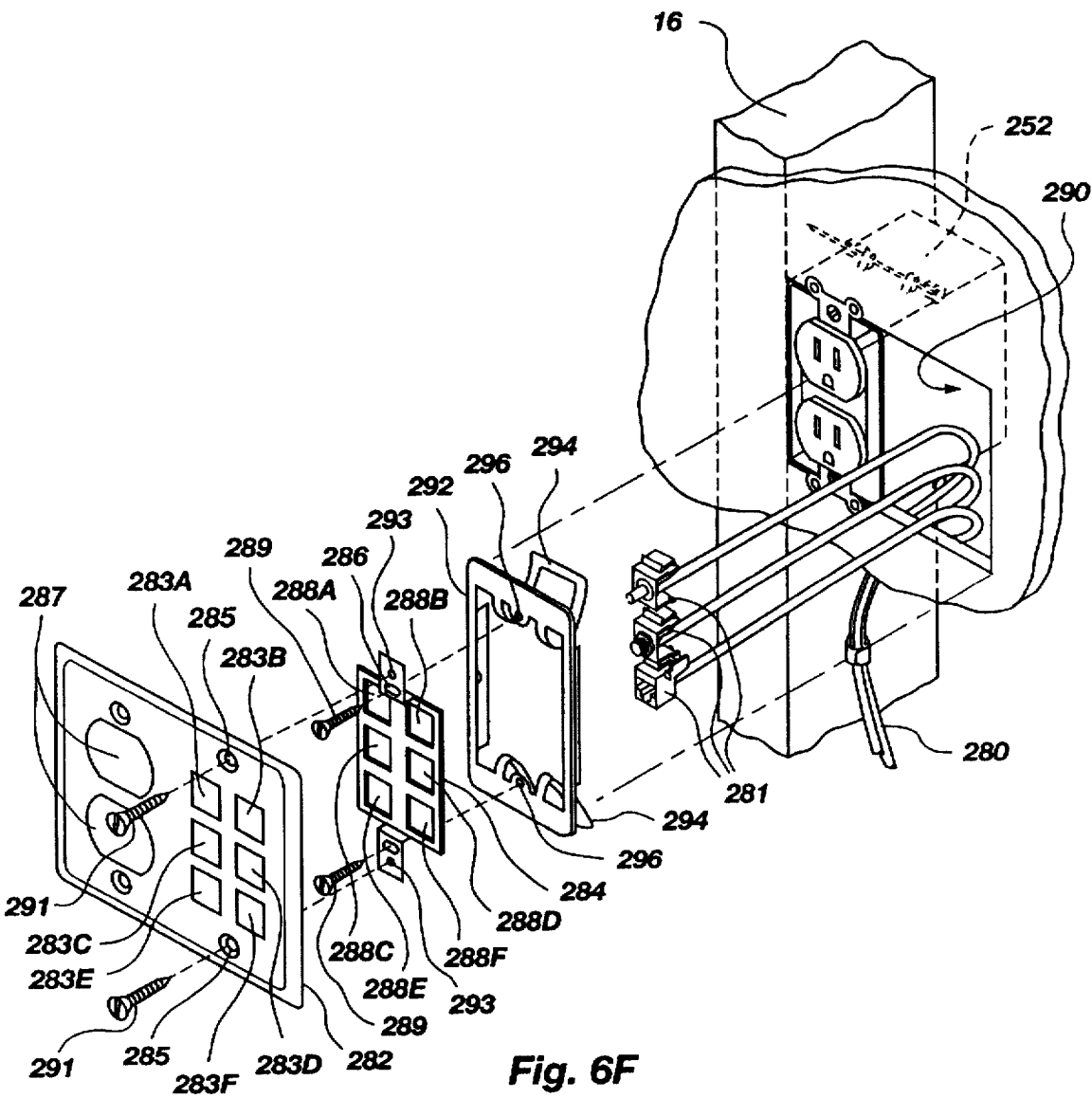
FIG. 6F shows the installation of a mounting plate in a wall with the capture plate and cover plate attached thereto.

FIG. 6F provides an illustration of the electrical box 252 with an electrical receptacle mounted therein and a mounting frame 292 placed in a hole 290 which has been formed in the wall board as described in connection with FIG. 6B. Also illustrated in FIG. 6F are formable fingers 294 which are attached to the mounting frame 292 and bend to hold the mounting frame 292 within the hole 290. The mounting frame 292 is provided with screw bores 296 which receive screws 289 placed through the respective bores 286 in capture plate 284. The bores 286 are preferably oversize, and can be an oval shape, to allow the capture plate 284 to be precisely positioned when fastened into place. With the cable connectors 281 inserted into the appropriate apertures 288A–F of the capture plate 284, the installation of the cable connector holding structures in the wall is greatly simplified and improved over the previously available schemes. The cover plate 282 is secured into place using screws 291 which are received through respective screw holes 285 in cover plate 282 and are threadably received by bores 293 provided on the capture plate 284. It is also within the scope of the present invention to secure the cover plate 282 in place using magnetized materials (particularly when the cover plate 282 is fabricated from a metallic material) or using a releasable catch structure as known in the art (particularly when using a cover plate 282 fabricated from a plastic material).

The structures represented in FIG. 6F allow the positioning of the capture plate 284 to be precisely controlled making the installation easier and often cosmetically more appealing than possible with previously available schemes. It will also be appreciated that the template 276 (FIG. 6B) can be formed to allow multiple capture plates 284 and mounting frames 292 to be installed side-by-side. Using the information set forth herein, additional cover plates can be fabricated to allow multiple capture plates 284 and mounting frames 292 to be installed side-by-side.

Figure 6G:
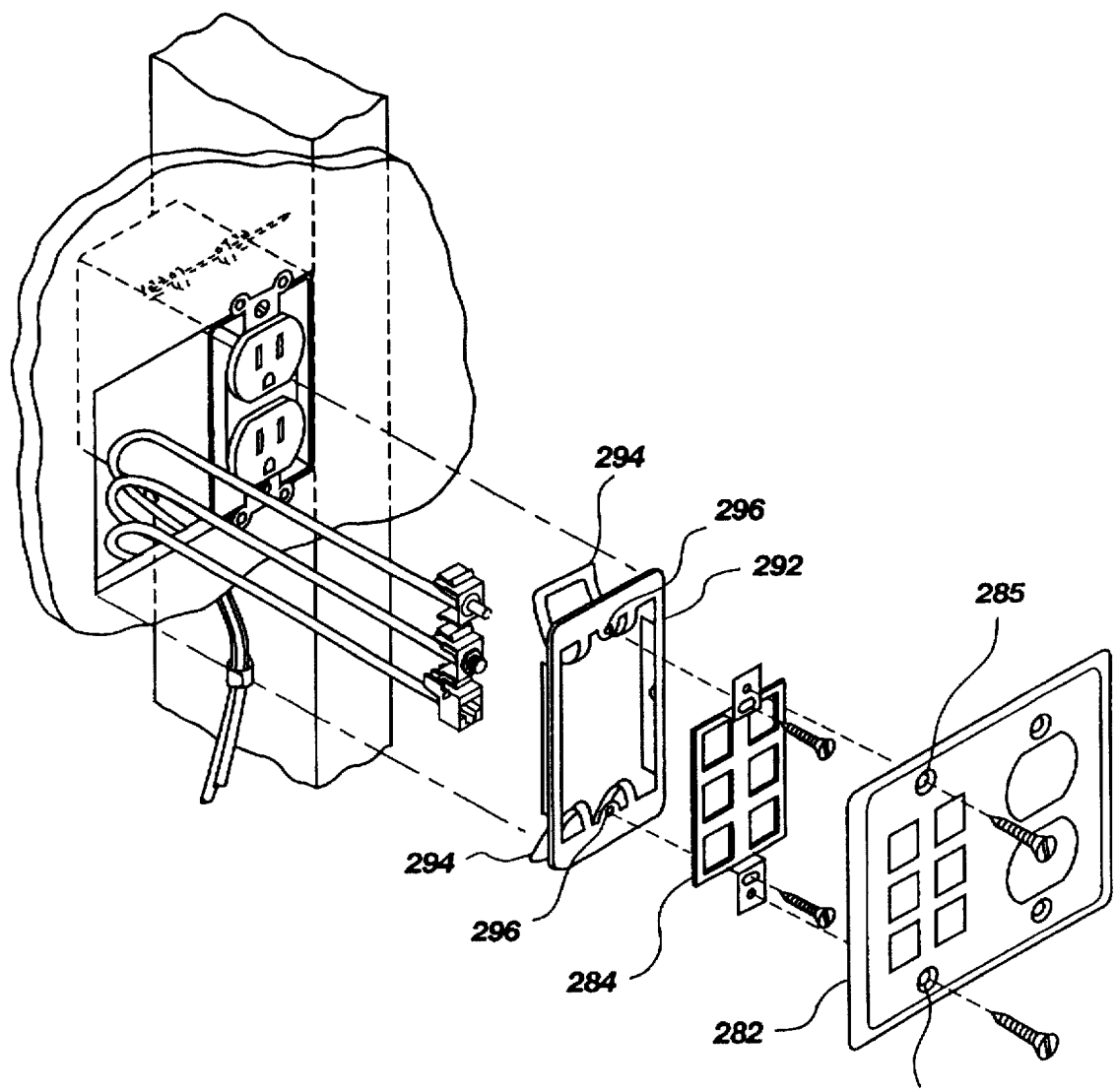
FIG. 6G shows the structures represented in FIG. 6F in a reversed orientation.
Figure 6H:
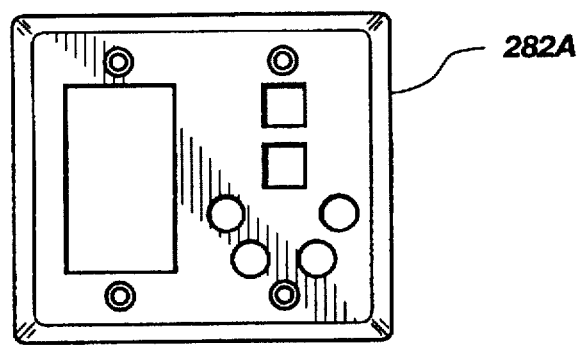
FIGS. 6H–I provide plan views additional arrangements for the cover plate.
Figure 6I:
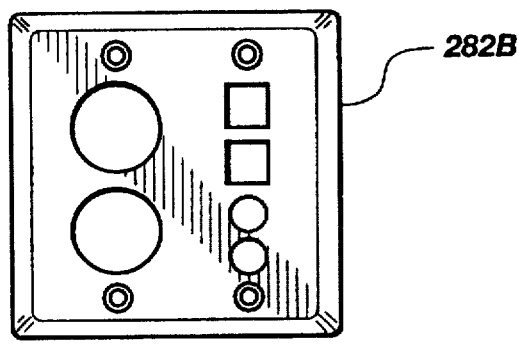

FIG. 6G illustrates the structures shown in FIG. 6F but in a reversed configuration. Since the cable connectors 276 (FIG. 6A) are attached to the capture plate 284, rather than to the cover plate 282, the cable connectors can be properly oriented in those instances where the connector (such as with RJ-xx series twisted pair connectors and SC style fiber optic connectors) which have a proper vertical orientation. With the arrangement represented in FIG. 6G, the capture plate 284 is installed as described in connection with FIG. 6F and the cover plate 282 is readily positioned in a reversed orientation. Thus, the orientation of the connectors 276 is properly maintained while the cosmetic appearance of the cover plate 282 is also preserved. Also provided in FIGS. 6H–I are alternative cover plate 282A–B, respectively, arrangements. FIGS. 6H–I show that the arrangement of the apertures can vary to accommodate differing needs and the necessary capture plates to accompany use of cover plates 282A–B can be readily arrived at using the information set forth herein.

The structures described in connection with FIGS. 6B–G allow the installation of cable holding structures in a wall, either in new construction or in a retrofit application, to proceed more efficiently than previously possible. The mounting frame 292 has an open back so that the cables are not crimped or unduly bent. Further, the bundle of cables 280 are held out of the way of damage during the installation of wall board and application of paint thereto but can be easily retrieved for installation into a cable connector holding structure. The structures also provide a more aesthetically desirable appearance since the positioning of the structures can be precisely adjusted.

Figure 7:
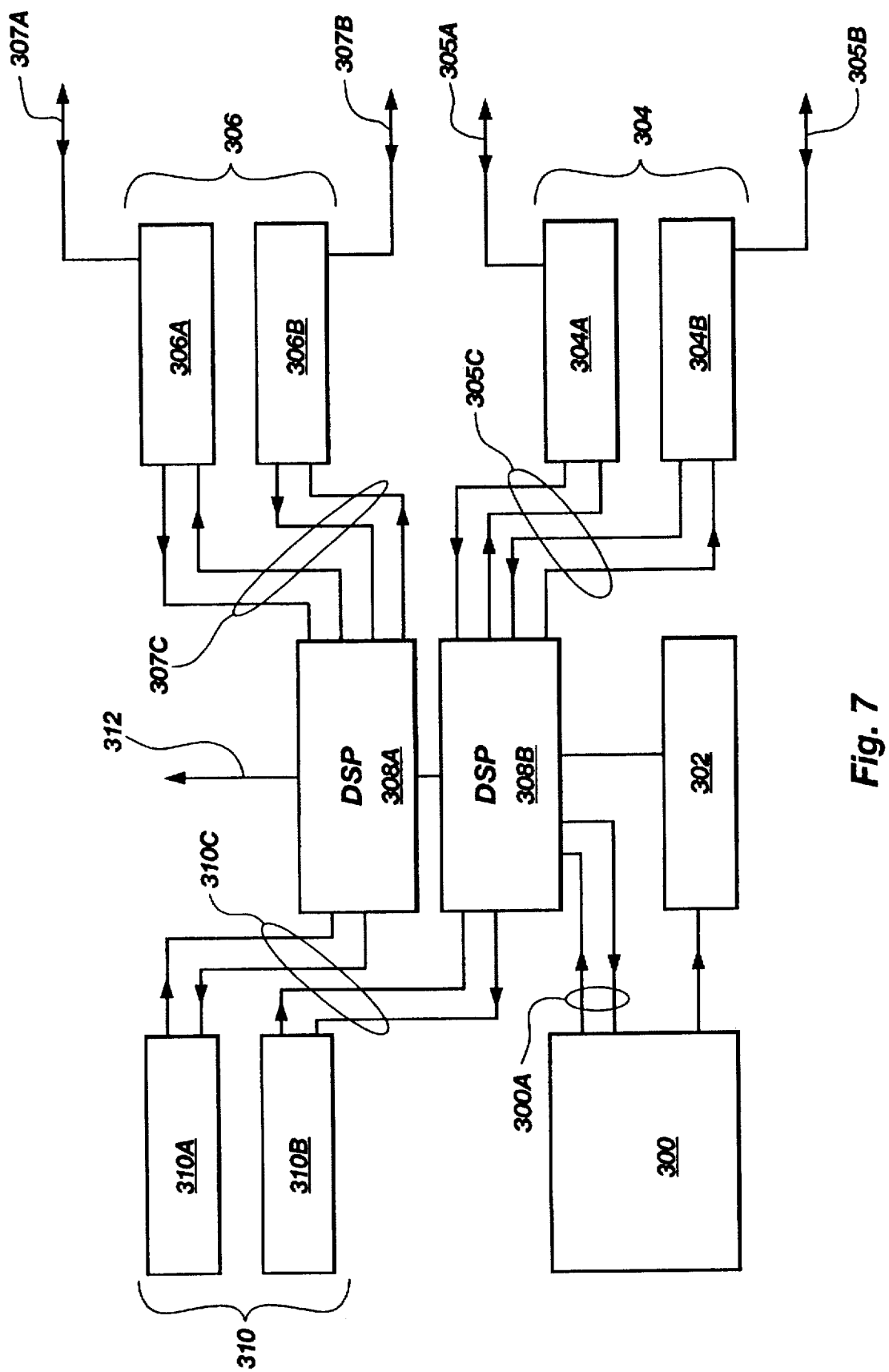
FIG. 7 is a functional block diagram of another embodiment of the present invention which functions as an interface for electronic information signals.
Figure 8:
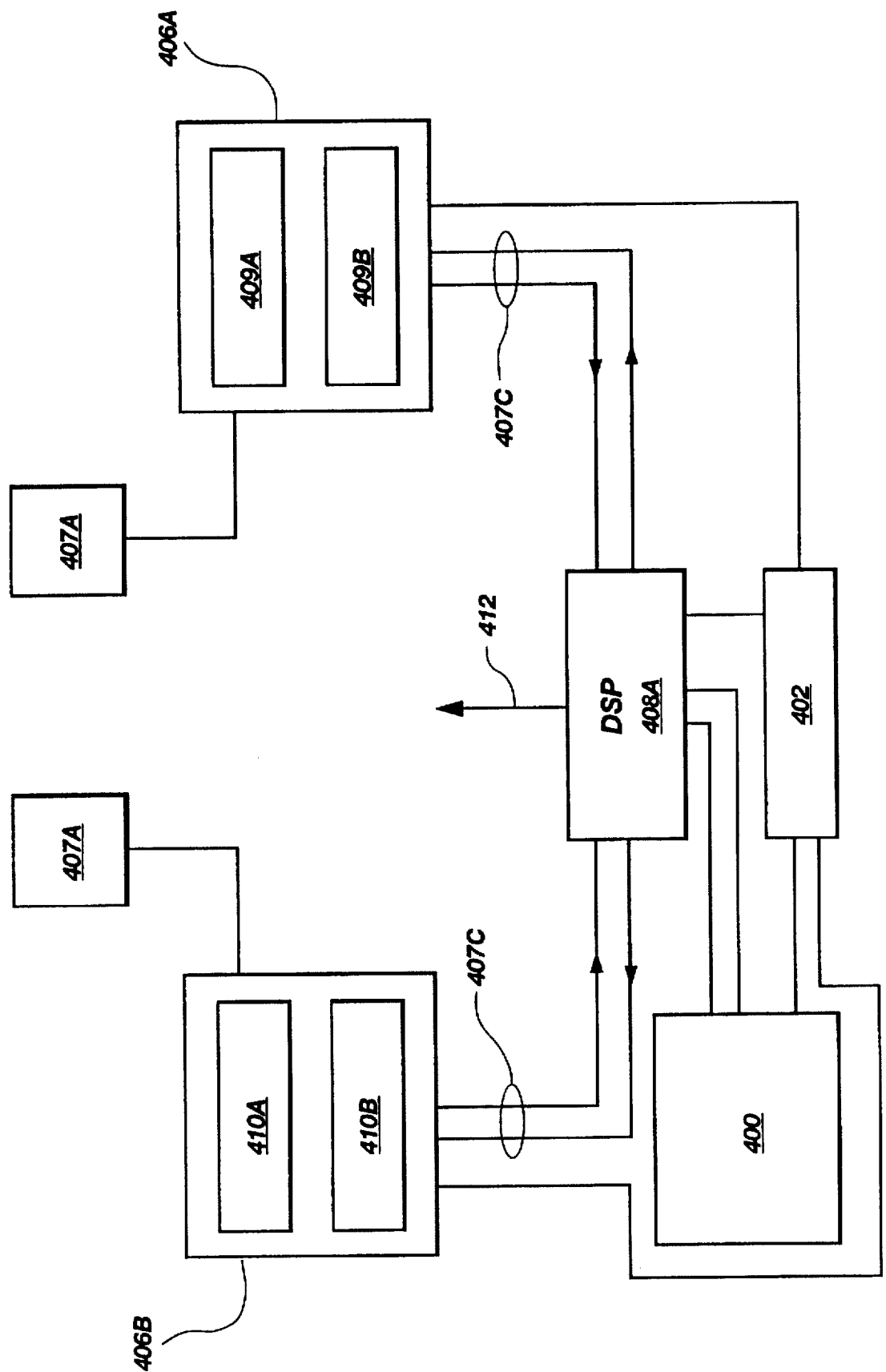
FIG. 8 is a functional block diagram of yet another embodiment of the present invention which functions as an interface for electronic information signals.

Reference will next be made to FIGS. 7–8 to explain another aspect of the present invention. As indicated above, the signal processor 172 (FIGS. 2A and 2B) provides the functions of combining, modulating, and conditioning any signals which enter a structure or which originate within the structure. In order to provide the advantage of taking whatever information which is presented by a utility provider and disseminating the information to one or more rooms of a structure, the electronic information signal interface represented in FIGS. 7 and 8 is furnished. FIGS. 7 and 8 are high level functional block diagrams of the interfaces and those skilled in the art can readily arrive at numerous different embodiments thereof using the information set forth herein. While the electronic information interfaces represented in FIGS. 7 and 8 have particular use in the earlier described embodiments of the present invention, the apparatus and methods described in connection with FIGS. 7 and 8 can be advantageously used in other applications.

Represented in FIG. 7 is an electronic information signal interface which preferably includes a microprocessor 300. The microprocessor 300 can be any of a number of microprocessors which are now available or which may become available in the future. Alternatively, the functions of the microprocessor 300 may be carried out by other suitable devices. For example, the microprocessor 300 can preferably be one available from Motorola and referred to as the Power PC series of RISC (Reduced Instruction Set Computer) microprocessors. Those skilled in the art can readily arrive at any additional components which can beneficially be associated with the microprocessor 300, such as memory or peripheral devices, as well as the necessary programming code.

Also represented in FIG. 7 is a power supply 302. The power supply 302 provides the necessary electrical power to components represented in FIG. 7 and can be readily devised by those skilled in the art.

As indicated earlier, the apparatus of FIG. 7 operates to interface with electronic information signals (both those signals which are received from utility providers originating outside the structure and signals which are generated within the structure) having one or more inherent signal protocols and to allow the dissemination of an information signal having a common protocol throughout the structure and which embodies the information conveyed by the original information signals.

Represented in FIG. 7 are bidirectional communication modules 304. The bidirectional communication modules 304 are intended to provide two way communication with an information using device located ether outside of the structure, for example a residential structure, or inside of the structure. A first bidirectional communication module 304A preferably includes devices necessary to connect to a coaxial cable, such as the coaxial cable commonly used to convey television signals by a cable television provider. The first bidirectional communication module 304A includes the components necessary to demodulate, and in order to allow transmission as well as reception of information signals the components necessary to modulate, radio frequency carriers and preferably also includes appropriate analog-to-digital and digital-to-analog convertors.

The first bidirectional communication module 304A is connected to a coaxial port represented at 305A which leads to a network of a utility provider or some other information generating device. While the apparatus of the invention represented in FIG. 7 preferably processes information in a digital form, it will be appreciated that the apparatus of the present information could also be implemented to process information in an analog form.

Also represented in FIG. 7 is a second bidirectional communication module 304B. The second bidirectional communication module 304B preferably includes devices necessary to connect to a twisted pair cable, such as the twisted pair cable commonly used to convey telephone signals by a telephone utility provider. The second bidirectional communication module 304B also includes the components necessary to transmit and receive information signals on a twisted pair port represented at 305B. Also preferably included are appropriate analog-to-digital and digital-to-analog convertors. The second bidirectional communication module 304B is connected to the twisted pair port 305B which leads to a network of a utility provider or some other information generating device.

Each of the bidirectional communication modules 304 are linked to a DSP 308B via a data path represented at 305C. The DSP 308B, and DSP 308A, are both digital signal processors such as those available from Texas Instruments, Analog Devices, Motorola, AT&T, and others. As known in the art, a digital signal processor is a programmable processor that, unlike a generally purpose processor such as the microprocessor 300, is programmed to perform one kind of processing at a time. Thus, while a general purpose processor is required to process all kinds of data in a variety of ways, a digital signal processor is intended to repeat the same process over and over on a particular kind of data, for example, digital video data, until reprogrammed to process another kind of data. It will be appreciated that only one DSP, or several DSPs, may be included in the apparatus in accordance with the principles of the present invention.

It will be appreciated that the microprocessor 300 works closely with, and controls the operation of, the DSPs 308A and 308B. The microprocessor 300 communicates with the DSPs 308A and 308B via lines 300A over which data and instructions pass. Those skilled in the art will realize the great advantages which accrue through the use of digital signal processors and will be able to arrive at appropriate programming code needed to perform specific interfacing and converting tasks.

It will be understood that the information conveyed to the bidirectional communication modules 304A&B via ports 305A&B may be analog or digital information complying with any number of different protocols inherent in the information being transmitted. The DSPs 308A&B, the microprocessor 300, and the bidirectional communication modules 304 together function to convert the information presented to the bidirectional communication modules 304 from any inherent protocol present in the signal to an information signal utilizing a common protocol which is dispatched on an output port represented at 312 to be disseminated to any number of devices as hereinbefore described.

The modularity of the bidirectional communication modules 304, as well as the modularity of the other devices described in connection with FIGS. 7 and 8, allow features and capacity to be added or removed from the apparatus as desired. Moreover, it is preferred that the data paths represented in FIGS. 7 and 8, for example data path 305C, be implemented as a fiber optic back plane into which the bidirectional communication modules 304, as well as other modules and devices represented in FIGS. 7 and 8, connect to communicate with the DSPs 308A&B and to other devices. It is preferred that the data path 305, as well as all of the data paths between devices and the DSPs 308A&B, employ fiber optic devices. Thus, with the use of fiber optic devices and techniques, the data paths will provide sufficient bandwidth for speedy conveying of large volumes of digital data. The data paths may also be formed using available electrical connections, as are known in the art, within the scope of the present invention.

Also represented in FIG. 7 are utility communication modules 306. The utility communication modules 306 are particularly adapted to provide communication with an information carrying medium provided by a utility provider. A first utility communication module 306A preferably includes devices necessary to connect to a fiber optic cable, such as the fiber optic cable used by some utilities to convey telephone and data signals by a telephone service provider. The first utility communication module 306A includes the components necessary to demodulate and, in order to allow transmission as well as reception of information signals, devices which can modulate light carriers onto a fiber optic cable. The first utility communication module 306A also preferably includes appropriate components to provide digital data to the DSP 308A. The first utility communication module 306A is connected to a fiber optic port represented at 307A which leads to the network of a telephone service provider or some other information generating device.

Also represented in FIG. 7 is a second utility communication module 306B. The second utility communication module 306B preferably includes devices necessary to connect to a coaxial cable, such as the coaxial cable commonly used to convey television signals. The second utility communication module 306B also includes the components necessary to transmit and receive information signals on a coaxial cable port represented at 307B. The second utility communication module 306B is connected to the coaxial cable port 307B which leads to a network of a utility provider or some other information generating device.

Each of utility communication modules 306 are linked to a digital signal processor 308A via a data path represented at 307C. It will be understood that the information conveyed to the utility communication modules 306A&B via ports 307A&B may be analog or digital information complying with any number of different protocols. The DSPs 308A&B, the microprocessor 300, and the utility communication modules 306 together function to convert the information presented to the utility communication modules 306 from any inherent protocol present in the signal to an information signal utilizing a common protocol which is dispatched on an output port represented at 312 to be disseminated to any number of devices as hereinbefore described.

It will be appreciated that the reference "utility communication module" refers to an intended function of the module and is not intended to limit the applications to which the module or modules can be employed. Communication modules can also be configured to receive and transmit radio frequency carriers to be broadcast into the air to establish a communications link. Communication modules can also be configured to receive and/or transmit information via the AC power line as discussed earlier. The power supply 302 can be readily used as a location for inserting information signals on, and extracting information signals from, the AC power line. The apparatus represented in FIG. 7 is flexible and can accommodate devices which function to further process, decode, and/or manipulate data.

Also represented in FIG. 7 are feature modules 310. The feature modules 310 are particularly adapted to process data which is handled by the apparatus. A first feature module 310A preferably includes devices necessary to decode a satellite television receiver signal which may be received by another module. Such data is passed to the first feature module 310A from the DSP 308A, and back again, via a data path 310C.

Also represented in FIG. 7 is a second feature module 310B. The second feature module 310B preferably includes components necessary to function as a video line doubler performing the task of enhancing the image generated by an video signal as known in the art. The second feature module 310B also preferably includes appropriate components to provide digital data to the DSP 308B which are conveyed by the data path 310C. Feature modules can also be configured for interfacing with home automation devices, such as those described herein, which conform to any of the now promulgated standards or any standard which may be promulgated in the future. The apparatus also can be configured to perform the routing of information packets necessary for the CEBus and Echelon home automation standards.

Reference will next be made to FIG. 8 which is a high level functional block diagram of another electronic information interface in accordance with the present invention. The apparatus illustrated in FIG. 8 follows generally the structure shown in FIG. 7 and is of a configuration which is particularly adapted for use in a residential structure which includes only connections to a telephone service provider and a cable television service provider. It will be appreciated that, as explained in connection with FIG. 7, the apparatus of FIG. 8 can be expanded as the need arises.

The apparatus of FIG. 8 includes a microprocessor 400 which preferably is selected in accordance with the characteristics described in connection with the microprocessor 300 represented in FIG. 7. Similarly, power supply 402 and DSP 408A are preferably selected in accordance with the same criteria as the corresponding components represented in FIG. 7.

Included in the apparatus of FIG. 8 are communication modules 406A and 406B. The communication module 406A is particularly configured to connect to a fiber optic network at port 407A. The fiber optic network can carry a variety of information signals most preferably as digital data as now available or as will become available in the future. The communication module 406B is particularly configured to connect to a coaxial cable network at port 407B. The coaxial cable network preferably carries television signals and other signals such as commonly provided by cable television service providers.

The communication modules 406A and 406B each include an interface 409A or 410A which receives the incoming information signal and includes components and software needed to accept the signal. Importantly, each of the interfaces 409A and 410A is configured to appear as the correct device to the utility provider service. For example, if in the case of communication module 406A which is connected to the telephone network, the interface 409A is configured to appear as a device which is generally provided by the telephone service provider. In the case communication module 406B which is connected to the cable television network, the interface 410A is configured to appear as a device which is generally provided by the cable television service provider. Each of the interfaces 409A and 410A must be configured to properly emulate the utility service provider equipment. Such equipment may conform to a widely promulgated protocol or may conform to a privately held proprietary protocol.

Each of the communication modules 406A and 406B also carry out the function of a protocol converter 409A and 410B. The protocol convertors 409A and 410B, in cooperation with DSP 408A, convert the information inputted to the communication modules 406A or 406B, which may adhere to any number of inherent protocols, and result in an output signal which adheres to a common protocol which is recognizable by all of the devices which will receive such information. For example, all of the devices which are located in the structure described above in connection with FIGS. 2A and 2B can be readily configured to accept and recognize the common protocol. Examples of such devices include televisions, computers, smart appliances, and other devices such as those described earlier.

In the case of bidirectional communication, the protocol converters 409B and 410B and the interfaces 409A and 410A manipulate and convert the information for transmission from the port 407A and the port 407B, respectively. The input/output of the apparatus is represented in FIG. 8 at port 412.

The apparatus of the present invention provides flexibility which has not hitherto been available in the art. The apparatus represented in FIGS. 7 and 8 can preferably be programmed to fulfill a variety of different applications. Indeed, since the preferred apparatus of FIGS. 7 and 8 is substantially entirely software driven the apparatus most advantageously can be adapted for different applications via programming downloaded at the apparatus, generally at the node zero location, or the programming can be downloaded from a remote location. For example, the microprocessor 300 or 400 is programmed to monitor the incoming information present on the utility provider's line and recognize commands which allow downloading of programing from a central office location. The downloading of new programming can carry out numerous changes in the functioning of the apparatus. For example, the programming downloaded from a central office can allow the customer to access, or deny access to, particular features of utility service, such as a pay-per-view television service.

The programability of the apparatus of FIGS. 7 and 8 allows features which have not otherwise been available in the industry. For example, the apparatus can be connected to numerous utility service providers and allow the customer to choose from among all of the providers and convey billing information to the provider. As a further example, the apparatus can allow the customer to have long distance telephone calls routed to any one of a number of different utility service providers, the choice of which utility service provider being based on such factors as the service provider's rates, the destination of the call, or even the telephone number being called.

Thus, the apparatus represented in FIGS. 7 and 8 acts as a gateway allowing only authorized information to enter and leave the distribution system. Moreover, the apparatus is also programmed to allow information such as automatic utility meter reading data, encrypted electronic banking information, high speed data communication, and other information to enter and leave the apparatus.

Figure 9:
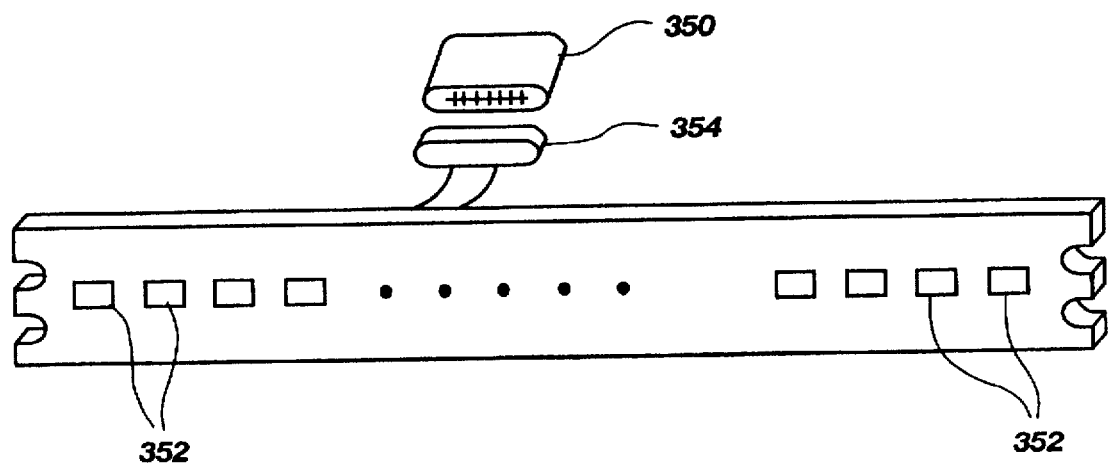
FIGS. 9–9A are diagrammatic and schematic, respectively, views of a telephone connection adapter in accordance with another aspect of the present invention.

Reference will next be made to FIG. 9 which is a diagrammatic representation of a telephone line distribution hub 350 which is available in the industry. The line distribution hub 350 is commonly attached to a telephone system control box, such as telephone system control box 173 in FIG. 3, which are commonly available in the art and which can be readily integrated into the systems described herein. Such telephone system control boxes are often part of a KSU or PBX internal telephone switching system such as those available in the art and those described earlier. In accordance with the benefits obtained with earlier described aspects of the present invention, it is very desirable to include components in embodiments of the present invention necessary to accommodate the future expansion of the system. In customary installations, a telephone system control box is directly connected to the a 50 position connector 354 as is known in the industry. When the 50 position connector 354 is attached to a corresponding connector (not represented) leading to a telephone system control box, different internal telephone lines are presented at each of the jacks (some of which are labeled at 352 and which preferably comply with the RJ-xx series standards which are well-known in the industry). The signals which are presented at the jacks 352 can then be patched to different locations in the building as described earlier in connection with FIG. 4.

Significantly, if an internal telephone system is not installed, the telephone line distribution hub 350 is not of any practical use in the prior art schemes and thus is not installed. In accordance with the present invention, the telephone line distribution hub 350 (or an equivalent structure) is installed in all instances, even where an internal telephone system is not contemporaneously installed but may be obtained in the future.

Figure 9A:
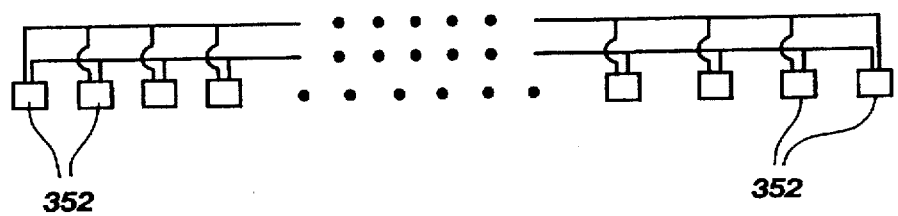

In order to utilize the telephone line distribution hub 350 even though an internal telephone system is not installed, a line adapter plug 356 in accordance with one aspect of the present invention is provided. The line adapter plug 356 is wired so that all of the jacks 352 are connected in parallel when the line adapter is used. The connection of the jacks 352 in parallel is schematically represented in FIG. 9A. One skilled in the art can readily wire the line adapter plug 356 to connect all of the jacks 352 in parallel in accordance with the information set forth herein. Thus, a telephone line distribution hub 350 can be installed ready for future connection to an internal telephone system control box but can also function to connect a telephone line signal placed onto one of the jacks 352 to all of the jacks 352. In this way, the telephone signals present on the jacks 352 can be patched through to all of the twisted pair locations throughout the building but will be joined to a single telephone line until a internal telephone system (for example a KSU or PBX) is obtained.

It will also be appreciated that it is within the scope of the present invention to provide the line adapter plug 356 to connect, for example, half of the jacks 352 in parallel with the remaining half of the jacks also wired in parallel. Thus, two telephone lines can be patched using the telephone distribution hub 350. Importantly, when an internal telephone system is obtained, the telephone system control box is directly connected to the 50 position connector 354 and a multiple line telephone system is ready for use with negligible or no rewiring.

Figure 10:
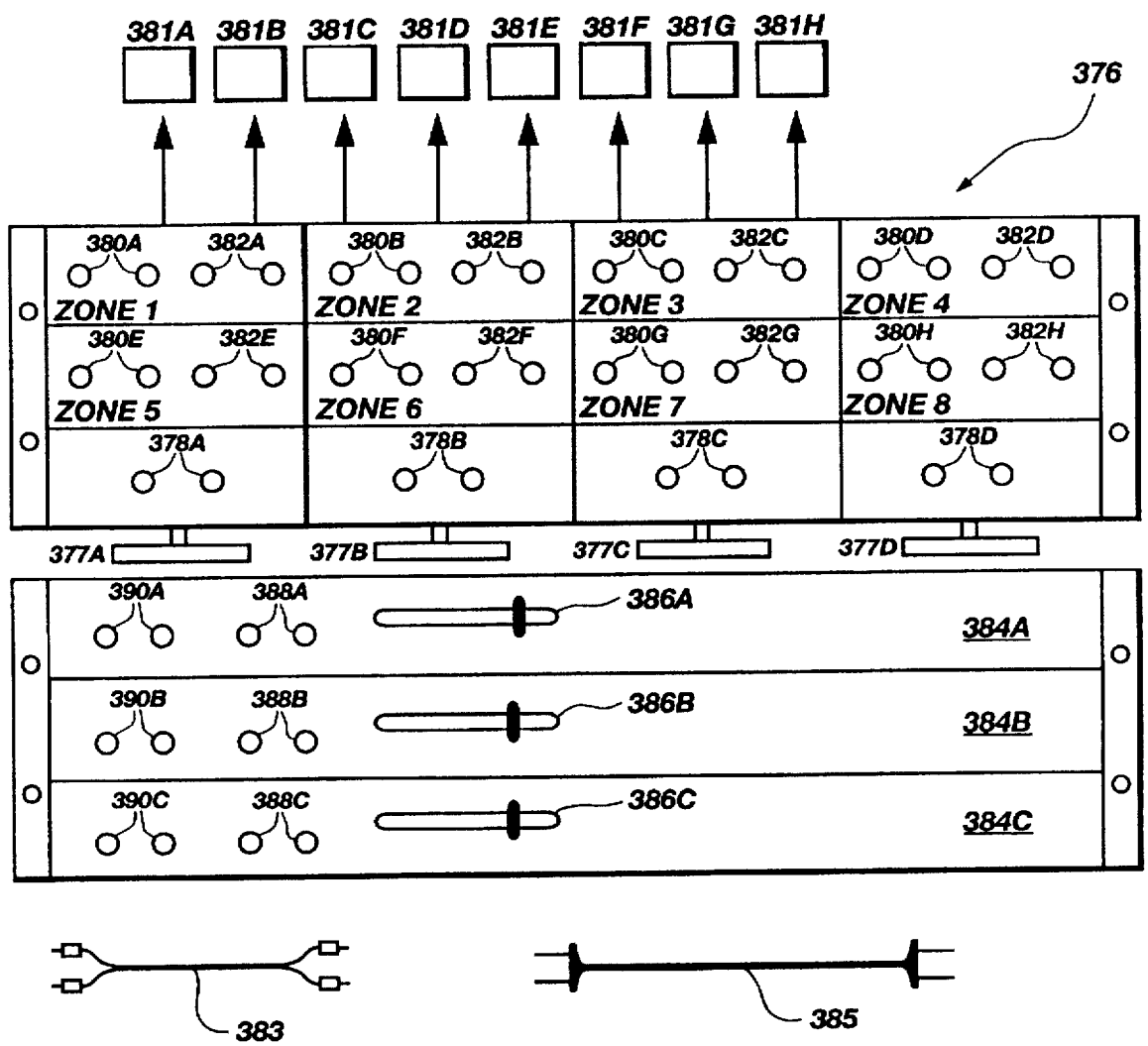
FIG. 10 is a diagrammatic view of an audio signal distribution system in accordance with another aspect of the present invention.

Reference will next be made to FIG. 10 which is a representation of an audio signal distribution system 376 in accordance with another aspect of the present invention. It will be appreciated that the audio signal distribution system 376 can be used alone in a building or can be integrated into other systems described herein, for example those systems described in connection with FIGS. 2, 3, and 4A–C. The components illustrated in FIG. 10 can preferably be provided with customary rack mounting structures as described earlier.

Provided on the audio signal distribution system 376 are a plurality of audio device line level outputs, each pair of outputs being labeled 378A–D. Each pair of line level outputs 378A–D preferably include a first connector for the left channel and a second connector for the right channel, each of the connectors preferably being an industry standard RCA phono jack. The illustrated structures can also be used to convey monaural audio signals as well. Each of the line level outputs 378A–D is connected to the output of a specific audio device, such as a tuner 377A, compact disc player 377B, cassette tape deck 377C, or another device 377D which provides an output. The devices providing program source material can be located anywhere in the structure and their signal conveyed as described earlier. Also provided are a plurality of speaker inputs 380A–H, each assigned to one of eight different zones in a building (381A–H), each of which leads to a speaker, or a speaker connection, in one of the zones. Each of the speaker inputs 380A–H are preferably connectors known in the industry as "banana jack" connectors also with provision for attaching bare wires thereto.

Most preferably, a plurality of amplifiers 384A–C are associated with the audio signal distribution system. Each of the amplifiers is Provided with a left channel and right channel line level inputs 388A–C as well as left channel and right channel speaker level outputs 390A–C. Each of the amplifiers 384A–C is provided with a gain control 386A–C. One exemplary patch cord having phono plugs on each end is represented at 383 and preferably can be used to connect the audio device line level outputs 378A–D to line level inputs 388A–C. Another exemplary patch cord having banana plugs on each end is represented at 385 which preferably can be used to connect the speaker level outputs 390A–C to any one of the one of the speaker inputs 380A–H. The banana plugs can conveniently be plugged into each other allowing more that one of the speaker level outputs 390A–C to be connected to more than one of the speaker inputs 380A–H.

It will be appreciated that the components represented in FIG. 10 provide front mounted access to both signal connections and controls. Providing signal connections in a front panel location affords ease of access and convenience which is not otherwise possible with previously available schemes. In contrast to the present invention, conventional wisdom dictates that the signal connections on amplifiers and similar equipment be hidden on the rear of the equipment for utility and cosmetic reasons. Moreover, the arrangement represented in FIG. 10 provides easy to understand labels for each of the building zones which allows a user, for example a homeowner, to readily make any desired changes. For example, the user need not move any furniture or equipment to gain access to the rear of the equipment. In contrast, the prior art schemes are often inconvenient, confusing and unreliable, particularly when changes are made by a homeowner.

Figure 11A:
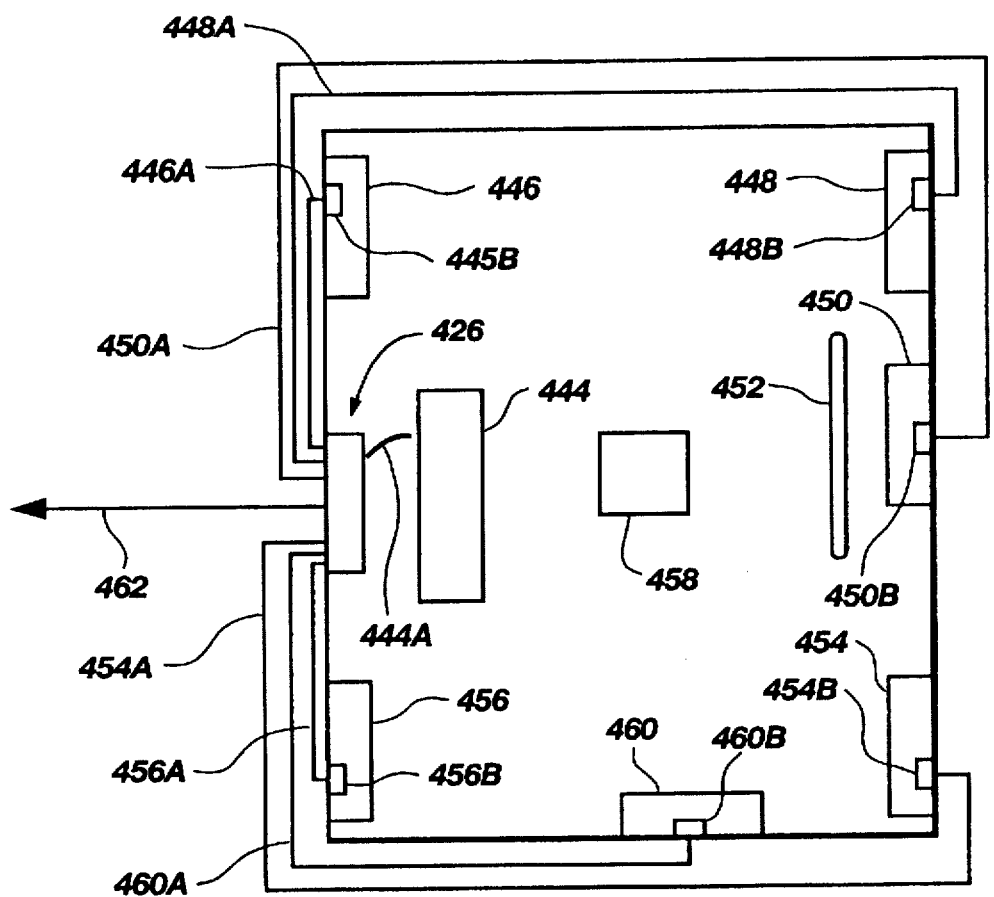

Reference will next be made to FIGS. 11A–C. FIG. 11A provides a plan view of a room which has been equipped as a home theater. It is becoming more common that a room in residential buildings are devoted to viewing audio/video recordings. In those cases where the audio and video quality approaches that experienced in a motion picture theater, the term "home theater" is commonly applied to such audio/video systems.

As can be appreciated from an examination of FIG. 11A, a number of cables must be strung to equip a typical home theater installation. Provided below in Table E is the identification of the components and cables shown in FIG. 11A.

TABLE E

| Reference No. | Device | Interconnection cable | Wall mounted jack |
|---|---|---|---|
| 444 | Audio/Visual equipment | 444A | — |
| 446 | Left Rear speaker | 446A | 446B |
| 448 | Left Front speaker | 448A | 448B |
| 450 | Center speaker | 450A | 450B |
| 452 | Video screen | — | — |
| 454 | Right Front speaker | 454A | 454B |
| 460 | Sub woofer | 460A | 460B |
| 456 | Right Rear speaker | 456A | 456B |
| 458 | Video projector | 458A | — |
| 462 | Connection to other sources/devices | — | — |

The number of cables indicated in FIG. 11A, all of which must be properly connected, can be confusing, especially to a new homeowner who just moved into a residential dwelling. Until the advent of the system of the present invention, in those instance where the cables were hidden in the walls, the cables often were left merely protruding from a hole in a wall near the location of the audio/visual equipment 444. Such schemes are both inefficient when connecting the cables to audio/visual equipment 444, particularly when a new owner moves into a residential dwelling, and often lead to an unsightly jumble of cables where the cables are gathered together.

In accordance with the present invention, a home theater signal distribution panel, generally indicated at 426, is provided. The home theater signal distribution panel 426 is preferably installed in a wall W, as indicated in the side view of FIG. 11C, near the location of the audio/visual equipment 444 (FIG. 11A).

As can be seen in the front view of FIG. 11B, the home theater signal distribution panel 426 provides a central location where the cables are terminated so that the audio/visual equipment can be readily connected to the proper components. Advantageously, the home theater signal distribution panel 426 can be installed with the necessary cables at the time the building is constructed and thus the audio/visual equipment can be readily connected whenever desired. Provided below in Table F are the preferred cable interconnections between provided on the front surface 428 of the home theater signal distribution panel 426 and the various components illustrated in FIG. 11A. It is preferred that the cable interconnections represented in FIG. 11A lead from the home theater signal distribution panel 426 to wall mounted jacks, available in the industry, to allow ready connection and disconnection of different components.

TABLE F

| Reference No. | Device | Interconnection cable | Wall mounted jack |
|---|---|---|---|
| 430D | Left Rear speaker | 446A | 446B |
| 430A | Left Front speaker | 448A | 448B |
| 430B | Center speaker | 450A | 450B |
| 430A | Right Front speaker | 454A | 454B |
| 430E | Sub woofer | 460A | 460B |
| 430F | Right Rear speaker | 456A | 456B |

Each of the speaker connections (430D, 430A, 430B, 430A, 430E & 430F) are preferably connectors known in the industry as "banana jack" connectors with provision for attaching bare wires thereto also. Each of the speaker connections are also preferably labeled as indicated in FIG. 11B.

Also preferably provided in the home theater signal distribution panel 426 are twisted pair connectors 432A&B. The twisted pair connector 432A is preferably a connector complying with the CAT5 standard as explained earlier. The twisted pair connector 432B is preferably an industry standard RJ-45 connector. Also preferably provided in the home theater signal distribution panel 426 are fiber optic connectors 434A&B. Also preferably provided in the home theater signal distribution panel 426 are coaxial cable connectors 436A&B. The twisted pair connectors 432A&B, fiber optic connectors 434A&B, and coaxial cable connectors 436A&B are preferably connected to an electronic information distribution system such as that described in connection with FIGS. 2, 3, and 4A–C. The bundle of cables 462 are attached to twisted pair connectors 432A&B, fiber optic connectors 434A&B, and coaxial cable connectors 436A&B and lead from the home theater signal distribution panel 426 to a central distribution system, such as that represented in FIGS. 2, 3, and 4A–C. It will be appreciated that a variety of signals can be sent to, and dispatched from, twisted pair connectors 432A&B, fiber optic connectors 434A&B, and coaxial cable connectors 436A&B. A coaxial cable connector 438 is also preferably provided leading to a connector adjacent to the video projector 458.

It will be appreciated that rather than the speaker level signals being distributed, line level signals can be distributed within the scope of the present invention. Moreover, those skilled in the art will appreciate that the system represented in FIGS. 11A–C can be adapted for use with proprietary audio systems and techniques (e.g. THX® and AC-3™ techniques) which are now available or which may become available in the future.

In the side view of FIG. 11B, a cover 440 is provided. The cover 440 is attached to the home theater signal distribution panel 426 by way of a hinge 440C so that the cover 440 can swing in the direction of arrow 440A. A lock 441 is preferably provided on the cover 440 so that the cover 440 can be locked in its closed position. A gap 440B is provided to allow a bundle of cables (444A in FIG. 11A) access to the connectors shown in FIG. 11b even when the cover 440 is locked in its closed position.

The use of the home theater signal distribution panel 426 represented in FIGS. 11A–C provides numerous advantages not previously available in the industry. For example, the home theater signal distribution panel provides a neat, clean, efficient, and compact apparatus for interconnecting the components of a home theater system. Other advantages include: Avoidance of damage to cables and cable connectors when loose cables are left protruding from a wall; Avoidance of unclear cable labeling schemes; Avoidance of unsightly jumbled balls of cables; Uncomplicated integration with other electronic signals present in the building; and, Quick connection between audio/visual equipment when new equipment is installed or old equipment is rearranged. All of the forgoing provides benefits which have hitherto been unavailable, particularly in a residential dwelling.

In view of the forgoing, it will be appreciated that the present invention provides an electronic information interface which interfaces a plurality of information signals received over a variety of media at a residential or commercial structure and interfaces those information signals to a common protocol which can be recognized by the information utilizing devices in the residential or commercial structure. The present invention also provides an electronic information interface which is configurable to be used with numerous different types of information utilization devices which are present in a residential or commercial structure and which is capable of bidirectional information transfer.

The present invention also provides an electronic information interface which can be programmed from a remote location such as from a utility provider central office and which is modular and can be easily expanded when desired. The present invention also provides an electronic information interface which can receive information conveyed via a variety of different media and convert the information from any of a variety of protocols to a common protocol.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for adapting a multi-line telephone signal distribution hub for use with one or more telephone lines, the multi-line telephone signal distribution hub comprising:

a plurality of twisted pair connectors each including at least two jack conductors;

a multi-line telephone connector having at least first set of plug conductors and a second set of plug conductors and having a connector receiver portion; and a plurality of interconnecting conductors coupling at least two of the jack conductors each to a respective one of the plug conductors so that individual telephone signals which are presented on the multi-line telephone connector are conveyed to one of the twisted pair connectors, the apparatus comprising:

first means for making physical and electrical contact with the first set of plug conductors of the multi-line telephone connector;

second means for making physical and electrical contact with the second set of plug conductors of the multi-line telephone connector;

first coupling means for electrically coupling a plurality of the first set of plug conductors so that the plurality of the first set of plug conductors of the multi-line telephone connector are electrically joined in parallel to each other;

second coupling means for electrically coupling a plurality of the second set of plug conductors so that the plurality of the second set of plug conductors of the multi-line telephone connector are electrically joined in parallel to each other;

means for holding the first means and the second means in physical and electrical contact, respectively, with the first set of plug conductors and the second set of plug conductors and for making physical connection with the connector receiver portion such that telephone signals cannot be directly presented to the multi-line telephone connector but any initial telephone signal which is presented on one of the twisted pair connectors appears on a plurality of the twisted pair connectors such that the initial telephone signal is also accessible from the plurality of twisted pair connectors.

2. An apparatus for adapting a multi-line telephone signal distribution hub for use with one or more telephone lines as defined in claim 1 wherein the plurality of twisted pair connectors comprise a plurality of RJ-xx series jacks and wherein the multi-line telephone connector comprises a jiffy position receptacle connector.

3. An apparatus for adapting a multi-line telephone signal distribution hub for use with one or more telephone lines as defined in claim 2 wherein the first means for making physical and electrical contact with the first set of plug conductors comprises a first portion of a fifty position plug connector.

4. An apparatus for adapting a multi-line telephone signal distribution hub for use with one or more telephone lines as defined in claim 3 wherein the second means for making physical and electrical contact with the first set of plug conductors comprises a second portion of the fifty position plug connector.

* * * * *